(12) United States Patent
Graham et al.

(10) Patent No.: US 6,804,659 B1
(45) Date of Patent: Oct. 12, 2004

(54) CONTENT BASED WEB ADVERTISING

(75) Inventors: Jamey Graham, Menlo Park, CA (US); David G. Stork, Portola Valley, CA (US)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 09/483,092

(22) Filed: Jan. 14, 2000

(51) Int. Cl.[7] .............................................. G06F 17/60
(52) U.S. Cl. ...................................................... 705/14
(58) Field of Search ........................................ 705/14

(56) References Cited

U.S. PATENT DOCUMENTS

| | | | |
|---|---|---|---|
| 5,105,184 A | | 4/1992 | Pirani et al. ................. 345/629 |
| 5,401,946 A | * | 3/1995 | Weinblatt ..................... 235/381 |
| 5,724,521 A | | 3/1998 | Dedrick ......................... 705/26 |
| 5,742,768 A | | 4/1998 | Gennaro et al. .............. 705/26 |
| 5,761,655 A | | 6/1998 | Hoffman |
| 5,832,474 A | | 11/1998 | Lopresti et al. |
| 5,838,317 A | | 11/1998 | Bolnick et al. |
| 5,855,008 A | * | 12/1998 | Goldhaber et al. ............ 705/14 |
| 5,943,679 A | | 8/1999 | Niles et al. |
| 5,948,061 A | | 9/1999 | Merriman et al. ........... 709/219 |
| 5,987,454 A | | 11/1999 | Hobbs |
| 6,006,197 A | | 12/1999 | d'Eon et al. .................. 705/10 |
| 6,026,409 A | | 2/2000 | Blumenthal |
| 6,044,376 A | * | 3/2000 | Kurtzman, II ............... 707/102 |
| 6,101,503 A | | 8/2000 | Cooper et al. |
| 6,185,614 B1 | * | 2/2001 | Cuomo et al. ............... 709/224 |

FOREIGN PATENT DOCUMENTS

EP          926614 A2 *   6/1999

OTHER PUBLICATIONS

Dialog Accession No. 04720812 "Web Wide Media Revolutionizes Online Advertising Industry," PR Newswire, p1205NYTH040, Dec. 5, 1996.

"c:\ . . . \9149920c.wpd—unmodified" Screen Shots of document created in Corel WordPerfect, 4 pages, (Apr. 30, 2002).

Begole et al., "Supporting Worker Independence in Collaboration Transparency," doc. IDS: ncstrl.vatech_cs/ TR–98–12, Virginia Polytechnic Institute and State University (1998).

(List continued on next page.)

*Primary Examiner*—Eric W. Stamber
*Assistant Examiner*—Donald L. Champagne
(74) *Attorney, Agent, or Firm*—Townsend and Townsend and Crew LLP

(57) ABSTRACT

According to the present invention, an internet target marketing system, method and computer program for distributing online advertising to viewers based upon the viewers' interests is provided. Specific embodiments according to the present invention can use an n-way matching of user's concepts of interest, advertiser's concepts and a currently viewed document to target advertising to the view of the current document. Some embodiments can generate a contextually sensitive advertisement for each page viewed in a browser, thereby associating an advertisement with every page in a document. Specific embodiments can associate advertising with documents that are substantially free of embedded advertisements, for example. Alternative embodiments can include embedded advertising, however.

16 Claims, 22 Drawing Sheets

OTHER PUBLICATIONS

Begole et al., "Flexible Collaboration Transparency," doc. IDS: ncstrl.vatech_cs/TR–98–11, Virginia Polytechnic Institute and State University (1998).

Boguraev et al., "Salience–based Content Characterization of Text Documents," In Proceedings of Workshop on Intelligent Scalable Text Summarization at the ACL/EACL Conference, Madrid, Spain, 12 pages (Jul. 7–12, 1997).

Langley et al., "Induction of Selective Bayesian Classifiers," Proc. of the Tenth Conference on Uncertainty in Artificial Intelligence, Seattle, WA pp. 399–406 (1994).

Langley et al., "An Analysis of Bayesian Classifiers," Proc. of the Tenth National Conference on Artificial Intelligence, San Jose, CA pp. 223–228 (1992).

Taghva et al., "Evaluation of an automatic markup system," Proceedings SPIE vol. 2422, Document Recognition II, pp. 317–327 (Mar. 1995).

Taxt et al., "Segmentation of Document Images," IEEE Transactions of Pattern Analysis and Machine Intelligence, vol. 11, No. 12, pp. 1322–1329 (Dec. 1989).

* cited by examiner

We have approached this challenge by introducing an
<SPAN class=rhtopic_Agent>intelligent agent </SPAN> that analyzes interactions
between user and<SPAN class=rhtopic_ExpertSystem>expert system </SPAN> and
automatically constructs database queries based on this analysis. The user is
unobtrusively notified when information relevant to the current diagnostic
context has been returned, and may immediately access it if desired. From the
user's perspective all database machinery is entirely transparent; indeed no
formal query language is even made available. Hence we term this approach
query-free information retrieval. <p>

As we hope will be apparent from what follows, the introduction of the
<SPAN class=rhtopic_Agent>intelligent agent </SPAN> additionally offers one
solution to a fundamental problem facing designers of cooperative information
systems: How can legacy systems of substantial complexity be integrated within
a larger system context? By requiring that all interactions with the legacy
database be mediated by the agent, we have been able to isolate the database
system cleanly while still supporting query-free information retrieval. <p>

FIXIT is comprised of the three subsystems already mentioned: the probabilistic
<SPAN class=rhtopic_ExpertSystem>expert system </SPAN>, the legacy full-text
database system (to which we added a new, semantically-based, indexing struc-
ture that supports limited <SPAN class=rhtopic_NLP>natural language </SPAN>
queries), and the <SPAN class=rhtopic_Agent>intelligent agent </SPAN> that
effectively integrates them. The following sections describe these system com-
ponents, provide implementation details, illustrate the runtime behavior of
FIXIT, report on operational experience, and close with some observations about
query-free information retrieval and the potential for generalizing the under-
lying paradigm. <p>

<h2> FIXITS's System Components</h2>
We first describe the probabilistic <SPAN class=rhtopic_ExpertSystem>expert
sub-system</SPAN> and the information retrieval sub-system. Before briefly
describing these, we stress that our purpose was not necessarily to advance the
capabilities of the individual components or indeed even to exploit fully the
best current technology; instead, we focus on their integration. <p>
<p>

FIG. 10

CONTENT BASED WEB ADVERTISING

CROSS-REFERENCES TO RELATED APPLICATIONS

This application incorporates by reference the following commonly owned copending U.S. Patent Application in its entirety for all purposes:

U.S. patent application Ser. No. 08/995,616, Entitled, "AUTOMATIC ADAPTIVE DOCUMENT HELP SYSTEM." filed Dec. 22, 1997.

The following commonly-owned co-pending application is hereby incorporated by reference in its entirety for all purposes:

U.S. patent application Ser. No. 09/483,094, Jamey Graham, et al entitled, "METHOD FOR INTRA-DOCUMENT COMPARISON IN A CONTENT BASED WEB ADVERTISING SYSTEM".

BACKGROUND OF THE INVENTION

The present invention relates to online advertising management and more particularly to techniques for targeting information in the Internet environment. Specific embodiments can target advertising and other marketing information.

With the rapid development of electronic commerce, the number of Internet companies offering free services with the goal of creating a customer base for web advertising has increased dramatically. Typically, Internet companies host web pages using a portal, a web page with links to many other web pages. Portals contain web advertisements. Companies advertising on the portal pay a royalty to the portal provider. Examples of popular portals include MYYAHOO, MYEXCITE, NETSCAPE NETCENTER, and HOTMAIL.

While there are perceived advantages to using web portals, further efficiencies can be had. For example, web portals are unable to provide advertising to the user once the user exits the realm of web pages controlled by the portal. Internet service providers (ISPs), such as America On Line (AOL), have more control over the advertising reaching their subscribers because the ISPs retain control over pages served to the user. However, to continue to provide advertising on every web page served to a user currently requires reformatting the web page or popping up annoying windows with advertisements in them.

What is needed is a technique for targeting advertising to online users without compromising user privacy.

SUMMARY OF THE INVENTION

According to the present invention, an internet target marketing system, method and computer program for distributing online advertising to viewers based upon the viewers' interests is provided. Specific embodiments according to the present invention can use an n-way matching of user's concepts of interest, advertiser's concepts and concepts contained in a currently viewed document to target advertising to the viewer of the current document. Some embodiments can generate a contextually sensitive advertisement for each page viewed in a browser, thereby associating an advertisement with every page in a document. Specific embodiments can associate advertising with documents that are substantially free of embedded advertisements, for example. Alternative embodiments can include embedded advertising, however.

In a specific embodiment according to the present invention, a method for targeting advertising to a user based upon content of an active document is provided. An active document can be one that is presently displayed to a user, for example. However, in some embodiments, an active document can be one that is being processed by a daemon or background process. The method includes analyzing at least one document to identify discussion of information corresponding to one or more user selectable concepts of interest. This analysis can provide a user concept relevance, which can comprise a measure of relevance of the document to one or more concepts defined by the user. The method can also include analyzing the document to identify discussion of information corresponding to one or more advertiser selectable concepts of interest. This analysis can provide an advertiser concept relevance, which can comprise a measure of relevance of the document to one or more concepts defined by the advertiser. The method can also include comparing the user concept relevance and the advertiser concept relevance for the document to determine an overall relevance. Selecting advertising having a particular overall relevance can also be part of the method. The particular relevance can be the greatest relevance, least relevance, or within a range of greatest or least relevance, for example. The method can also include displaying the advertisement selected to a user.

In another embodiment according to the present invention, a system for targeting advertising to a user based upon content of one or more documents displayed to the user is provided. The system comprises a profile content recognizer that analyzes contents of documents for information corresponding to one or more user selectable concepts. The profile content recognizer provides an output of concepts contained in the document that correspond to the one or more user selectable concepts. The system also comprises an advertising content recognizer that analyzes content of documents for information corresponding to one or more advertiser selectable concepts. A comparator compares the output from the profile content recognizer and the output from the advertising content recognizer and selects from a plurality of stored advertisements ones that are relevant to the information contained in the documents based upon the comparison.

In a further embodiment according to the present invention, a computer program product for targeting advertising to users based upon a content of one or more documents displayed to the user comprises code for analyzing the documents to identify discussion of information corresponding to one or more user selectable concepts of interest is provided. This code can provide a user concept relevance indication, which can comprise a measure of relevance of the document to one or more concepts defined by the user. Code for analyzing the documents to identify discussion of information corresponding to one or more advertiser selectable concepts of interest is provided. This code can provide an advertiser concept relevance indication, which can comprise a measure of relevance of the document to one or more concepts defined by the advertiser. Code for comparing the user concept relevance and the advertiser concept relevance for the document in order to determine an overall relevance is also part of the product. Code for selecting advertising having a particular overall relevance and a computer readable storage medium for holding the codes are also part of the product. The particular relevance can be the greatest relevance, least relevance, or within a range of greatest or least relevance, for example.

In a yet further embodiment according to the present invention, a method for automatically associating advertising objects with web objects is provided. The method includes analyzing one or more web objects to identify information corresponding to at least one first concept of interest and analyzing the one or more web objects to identify information corresponding to at least one second concept of interest. Determining a relevance between the first concepts of interest and the second concepts of interest can also be part of the method. The method can also include associating the one or more web objects with the one or more advertising objects based upon the relevance.

In a still further embodiment according to the present invention, a computer program product for automatically associating advertising objects with web objects is provided. Code for analyzing one or more web objects to identify information corresponding to at least one first concept of interest can be part of the product. Code for analyzing the one or more web objects to identify information corresponding to at least one second concept of interest can also be part of the product. The product can also include code for determining a relevance between the first concept of interest and the second concept of interest. Code for associating the one or more web objects with the one or more advertising objects based upon relevance and a computer readable storage medium for holding the codes can also be part of the product.

Numerous benefits are achieved by way of the present invention over conventional techniques. The present invention can provide a way to target advertising relevant to the viewer's current interests along with web pages on a single screen. Embodiments according to the present invention can achieve more specific targeting than techniques known in the art. For example, some embodiments can detect that one user's definition of sports includes hunting and fishing, while another user's idea of sports may include marathon running. Such embodiments can provide better targeting of advertisements than conventional techniques. Some embodiments according to the present invention can provide better protection of viewers' privacy than conventional web browser user interfaces. Embodiments according to the invention can provide more information to the user than known techniques. Many embodiments according to the invention will enhance the user's web browsing experience by providing indication of which links are likely to be of most interest. These and other benefits are described throughout the present specification.

A further understanding of the nature and advantages of the inventions herein may be realized by reference to the remaining portions of the specification and the attached drawings.

BRIEF DESCRIPTION OF THE DRAWINGS

FIG. 10 illustrates a portion of a representative HTML document processed in a particular embodiment according to the present invention.

DESCRIPTION OF THE SPECIFIC EMBODIMENTS

According to the present invention, an interest profile based target marketing system, method and computer program for distributing online advertising to viewers based upon the viewers' interests is provided. An embodiment according to the present invention has been reduced to practice under the name Reader's Helper™.

Representative embodiments according to the present invention provide one or more marketing information areas on a web browser, for example. The marketing information areas can provide viewers access to advertising, public service information and the like. The marketing information display area can provide consistent, unobtrusive access to marketing information. Embodiments according to the present invention are operable with many of a wide variety of web browsers known to those of ordinary skill in the art, such as web browsers provided by NEOPLANET, a company with headquarters in Phoeniz, Ariz. (www.neoplanet.com), MICROSOFT CORPORATION's Internet Explorer, NETSCAPE Navigator, and the like. The marketing information display area can provide a location for advertising, and the like, which does not interfere with the document's content.

Targeted advertising refers to the organized exposure of marketing information to persons determined to be most likely to buy the product or service being advertised. Targeting can be performed based upon persons' demographic and other information, for example. The determination is made based upon a profile for a particular person developed from information about the person's usage of products or services, and the like. For example, information about the web pages a person visits can be gathered and analyzed to provide a profile of the person's interests and the like. Web advertisement objects likely to appeal to a particular user can be displayed in marketing information area of the user's browser. In another embodiment, marketing information can be distributed based upon information about the web "channels" a person uses. In one embodiment, users who view web pages and use channels via a particular portal provide information that can be used to target advertising using the marketing information area in the user's browser. Embodiments can analyze the Uniform Resource Locators (URLs) associated with the web pages browsed by the user. Other embodiments can analyze the content of the web pages themselves to gather information about the user's interests.

Figure 1A:
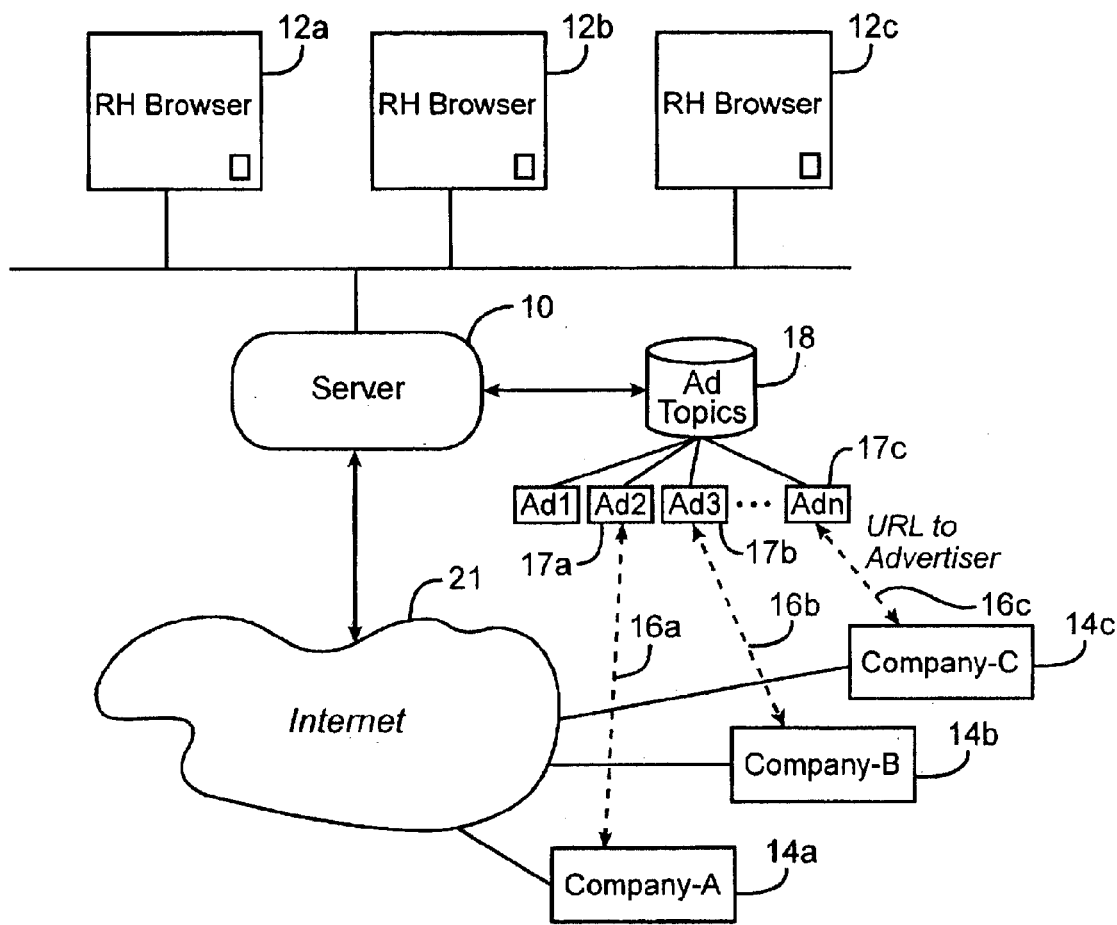
FIGS. 1A–1C illustrate a representative system for implementing a particular embodiment according to the present invention.

FIG. 1A illustrates a simplified block diagram of a representative system for targeting marketing information in a particular embodiment according to the present invention. This diagram is merely an example which should not limit the scope of the claims herein. One of ordinary skill in the art would recognize many other variations, alternatives, and modifications. FIG. 1A illustrates a server 10 that provides an interface between one or more client browsers 12a, 12b and 12c and one or more advertisers 14a, 14b and 14c. Server 10 can access a URL for each advertiser. The URL can point to a particular advertiser's desired marketing information. For example, in FIG. 1A, URLs 16a, 16b and 16c point to marketing information for advertisers 14a, 14b and 14c, respectively. In a presently preferable embodiment, marketing information can comprise animated GIF format files. However, multimedia objects having formats such as MPEG, JPG, and the like, as well as information objects having other formats known to those of ordinary skill in the art, can also be used in select embodiments according to the present invention. In a representative specific embodiment illustrated by FIG. 1A, a database 18 can store advertising, for example, indexed by concept. FIG. 1A illustrates a plurality of representative advertisements, including advertisements 17a, 17b and 17c that can contain marketing information from advertisers 14a, 14b and 14c. Advertisements 17a, 17b and 17c have corresponding URLs 16a, 16b and 16c that enable the advertisements to be accessed by the advertisers for maintenance purposes, and the like. Server 10 can retrieve advertisements 17a, 17b and 17c via Internet 21, for example, based upon a determined relevancy between the user's interests, which can be included in a profile, for example, the advertiser's concepts and the content of the current document being viewed.

It is a noteworthy aspect of embodiments according to the present invention that advertisers can update their corresponding marketing information substantially independently of interfering with the clients' viewing of the information. In a presently preferable embodiment, advertisers can also monitor usage of their marketing information by the clients by, for example, counting the "hits" on a particular web object corresponding to the advertiser's marketing information to indicate usage. In some embodiments, usage statistics can be provided by server 10.

Figure 1B:
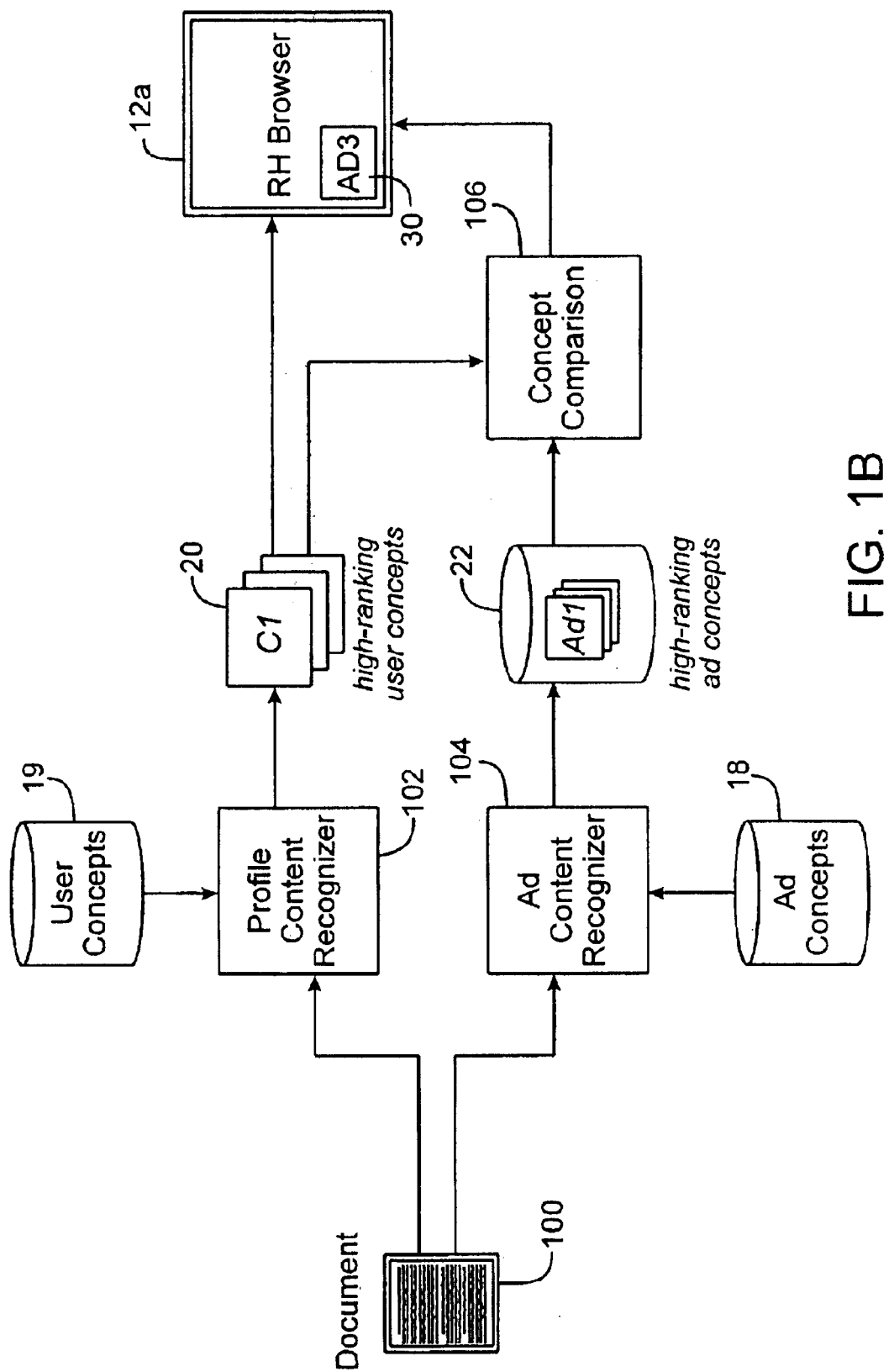

FIG. 1B illustrates a simplified flow diagram for a representative process for targeting marketing information in a particular embodiment according to the present invention. This diagram is merely an example which should not limit the scope of the claims herein. One of ordinary skill in the art would recognize many other variations, alternatives, and modifications. FIG. 1B illustrates a process that can be embodied in server 10 of FIG. 1A, for example. A document 100 is input for both a profile content recognizer 102 and an advertisement content recognizer 104. Profile content recognizer 102 can also input user selectable concepts from database 19. Profile content recognizer 102 produces an output 20 comprising one or more user concepts from database 19 that are relevant to the contents of document 100. Advertisement content recognizer 104 can input advertiser concepts from database 18. Advertisement content recognizer 104 produces an output 22 comprising one or more advertising concepts from database 18 that are relevant to the contents of document 100. A concept comparator 106 compares user concept output 20 from profile content recognizer 102 and advertiser concept output 22 from advertisement content recognizer 104 to produce as an output a "best ad," 30, an advertisement targeted to the user of client browser 12a based on the content of the document, the user's interests and the content of the advertisements. User concept output 20 can also be provided to browser 12a to provide indication to the user of relevance of the document to the user's concepts of interest. In a presently preferable embodiment, these processes can co-reside on an Internet Service Provider's (ISP) servers, or a proxy service, so that advertisers are unable to access the users' profiles in database 19. In a specific embodiment, advertisers can, however, receive statistical information regarding usage from the ISPs.

In a specific embodiment, the user's personal profile can be used to annotate specific portions of a document displayed to the user that are of a greater interest to the user, as defined by the user's chosen concepts of interest in the personal profile. In some specific embodiments, the annotated phrases in the portion of the document being viewed and/or all phrases in the portion of the document being viewed can be used to pinpoint what a user might be interested in. For example, the user may be viewing a portion of a document which contains many highlighted keywords related to the user's concepts of interest. The user can be sufficiently interested in such a document portion to closely read the contents. Therefore, advertising can be targeted based upon the information that the user is currently reading. In this case, the highlighted words can be compared with the advertising concepts in order to determine an appropriate advertisement to display at that time. Such embodiments can provide better advertising for a user as the user reads a document, and can change the advertisement being displayed as the user scrolls through the document.

Figure 1C:
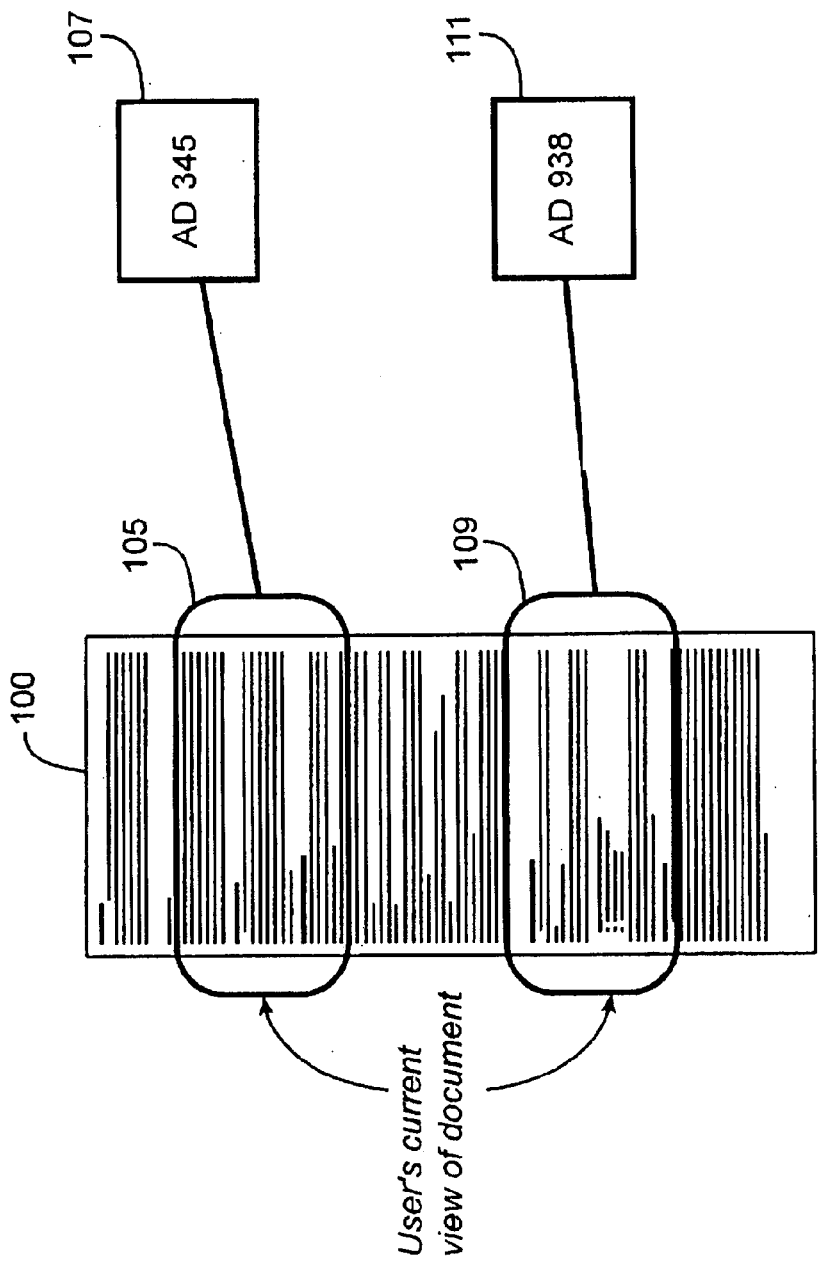

FIG. 1C illustrates a simplified diagram of a representative search technique in a particular embodiment according to the present invention. This diagram is merely an example which should not limit the scope of the claims herein. One of ordinary skill in the art would recognize many other variations, alternatives, and modifications. FIG. 1C shows a first portion of an example document 105, viewable by a user. Document portion 105 includes several highlighted words. These highlighted words comprise a context that causes the display of a first advertisement 107, "Ad 345" because of the correspondence between the concepts in this advertisement and the concepts in the contents of the document portion 105. Later, the user views a new area of the document, document portion 109. These highlighted words comprise a context that causes the display of a second advertisement 111, "Ad 938" because it is now the most relevant advertisement to the concepts being viewed by the user. If the use of only the highlighted words does not yield an advertisement with a sufficient relevancy score, $R_j$, other phrases contained in the viewing area can be used as the matching criteria for the collection of advertising concepts.

Figure 2:
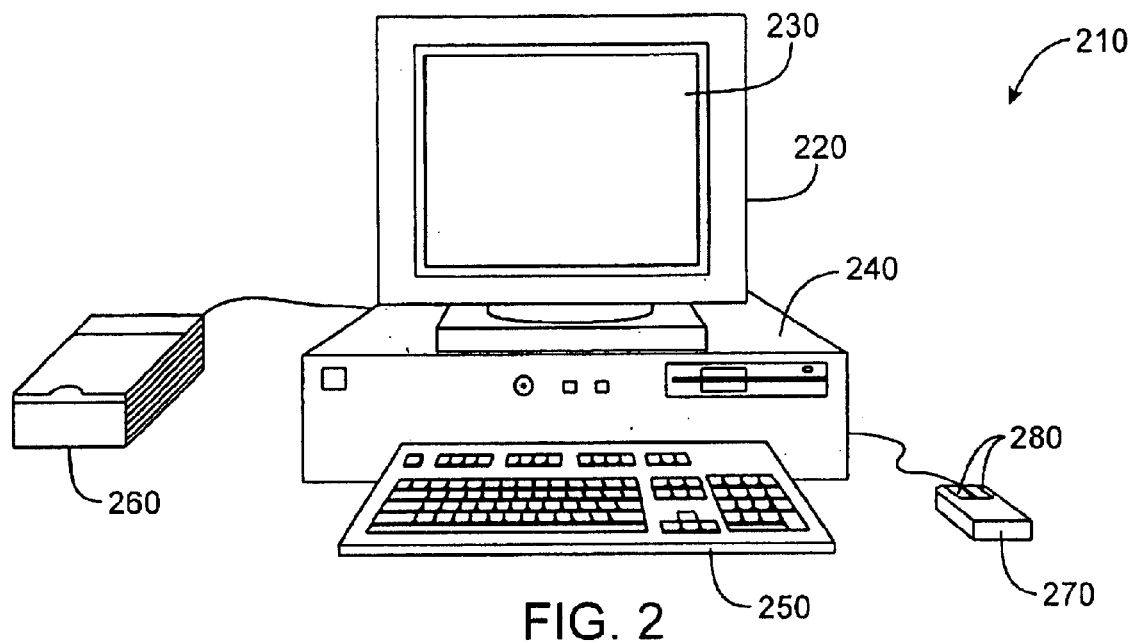
FIG. 2 illustrates a representative computer system in a particular embodiment according to the present invention.

FIG. 2 is an illustration of a representative system according to a particular embodiment of the present invention. This diagram is merely an example which should not limit the scope of the claims herein. One of ordinary skill in the art would recognize many other variations, alternatives, and modifications. FIG. 2 depicts but one example of many possible computer types or configurations capable of being used with the present invention. Embodiments according to the invention can be implemented in a single application program such as a browser, or may be implemented as multiple programs in a distributed computing environment, such as a workstation, personal computer or a remote terminal in a client-server relationship. FIG. 2 shows computer system 210 including display device 220, display screen 230, cabinet 240, keyboard 250 and mouse 270. Mouse 270 and keyboard 250 are representative "user input devices." Other examples of user input devices are a touch screen, light pen, track ball, data glove and so forth. FIG. 2 is representative of but one type of system for embodying the present invention. It will be readily apparent to one of ordinary skill in the art that many system types and configurations are suitable for use in conjunction with the present invention.

In a preferred embodiment, computer system 210 includes a Pentium® class based computer, running Windows® NT operating system by Microsoft Corporation. However, the method is easily adapted to other operating systems and architectures by those of ordinary skill in the art without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

Figure 3:
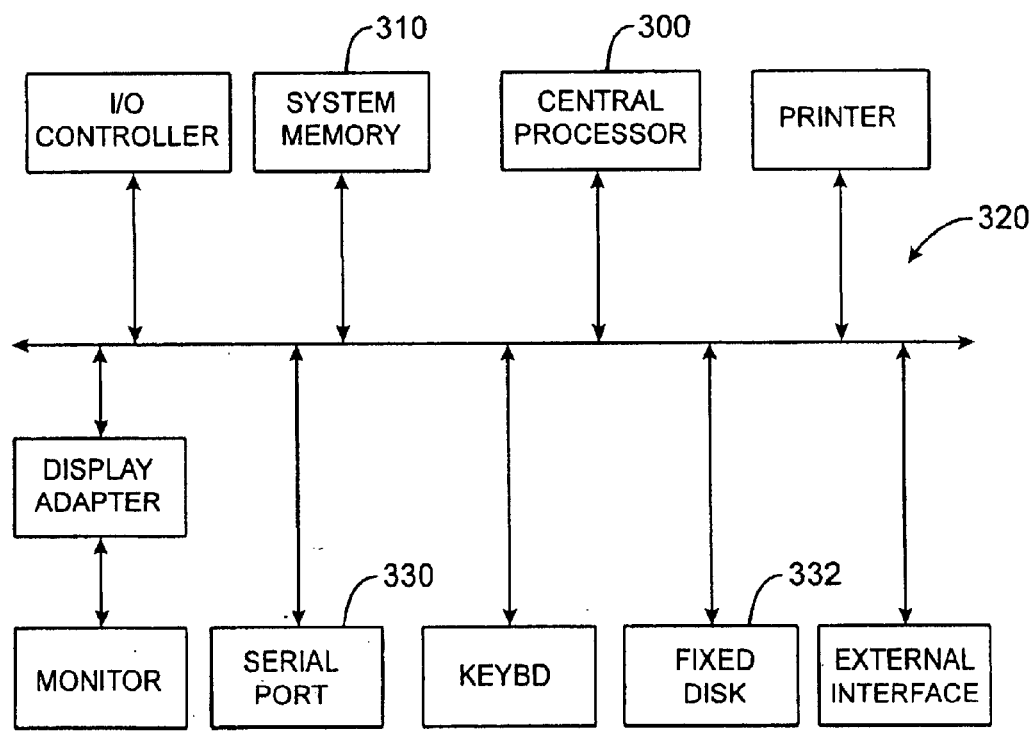
FIG. 3 illustrates basic subsystems of the system of FIG. 2.

FIG. 3 is an illustration of basic subsystems in computer system 210 of FIG. 2. In FIG. 3, subsystems are represented by blocks such as central processor 300, system memory 310, etc. This diagram is merely an example which should not limit the scope of the claims herein. One of ordinary skill in the art would recognize many other variations, alternatives, and modifications. The subsystems are interconnected via a system bus 320. Additional subsystems such as a printer, keyboard, fixed disk and others are shown. Peripherals and input/output (I/O) devices can be connected to the computer system by any number of means known in the art, such as serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk 332, as well as the exchange of information between subsystems. Other arrangements of subsystems and interconnections are readily achievable by those of ordinary skill in the art. System Memory 310, and fixed disk 332 are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

In a presently preferable embodiment, a concept indicator can be used to provide an indication of relevance of the content of a document to one or more concepts in conjunction with a web browser that can provide one or more display areas for documents and marketing information. The concept indicator illustrates the results of analyzing documents the user browses for content relevant to the user selectable concepts of interest. A value is assigned based upon a determined likelihood that the document is of interest to the user. In a presently preferable embodiment, key phrases used throughout a document are automatically highlighted according to their relevance to the user's selectable concepts of interest so that the user can find relevant information more efficiently. Each user-defined concept of interest can include a collection of key phrases that describe important features in documents about that concept. The concept indicator can provide an indication to a user whether a document is about the concept and worth reading. Concept indicators are described in greater detail in a commonly owned copending U.S. patent application Ser. No. 08/995,616, now abandoned the entire contents of which are incorporated herein by reference for all purposes.

Embodiments according to the present invention can provide the ability to create advertising and other marketing information which target viewers of web pages or documents that are most likely to be read by people who would be interested in their products. For example, techniques according to the present invention can determine that advertisements for "Outside" magazine would be of interest to readers of documents or web pages that contain information about mountaineering or trekking, as well as readers indicating a preference for these concepts of interest, for example. Advertisements for conferences, for example, can be triggered by displaying abstracts of papers from a previous conference on the same subject matter, for example.

In a particular representative embodiment according to the present invention, advertising can be targeted based upon the user's concepts of interest and how relevant these concepts are for a particular document. Relevance can be determined using a scoring or other method as described below. This information, in conjunction with the actual content of the document, can be used to target advertising to users. Concepts, which define sets of interests, can be collected from user input or other mechanisms. In a presently preferable embodiment, user privacy can be maintained because user profiles are not shared with advertisers. User profiles can be stored locally on the client computer, or at an ISP server, or a proxy service, for example. In some specific embodiments, advertisers can be provided statistical information recorded by the user's browser, for example.

In a yet further embodiment according to the present invention, advertising can be selected based on content analysis. Advertising can be associated with web page contents for portals and the like based upon a system of assigned concepts. Providers of web portals, for example, can create a set of associations between web pages linked to the portal web page and the advertisement. In a particular embodiment, content analysis techniques can provide the associations between advertising objects and web objects based upon particular categories.

Figure 4A:
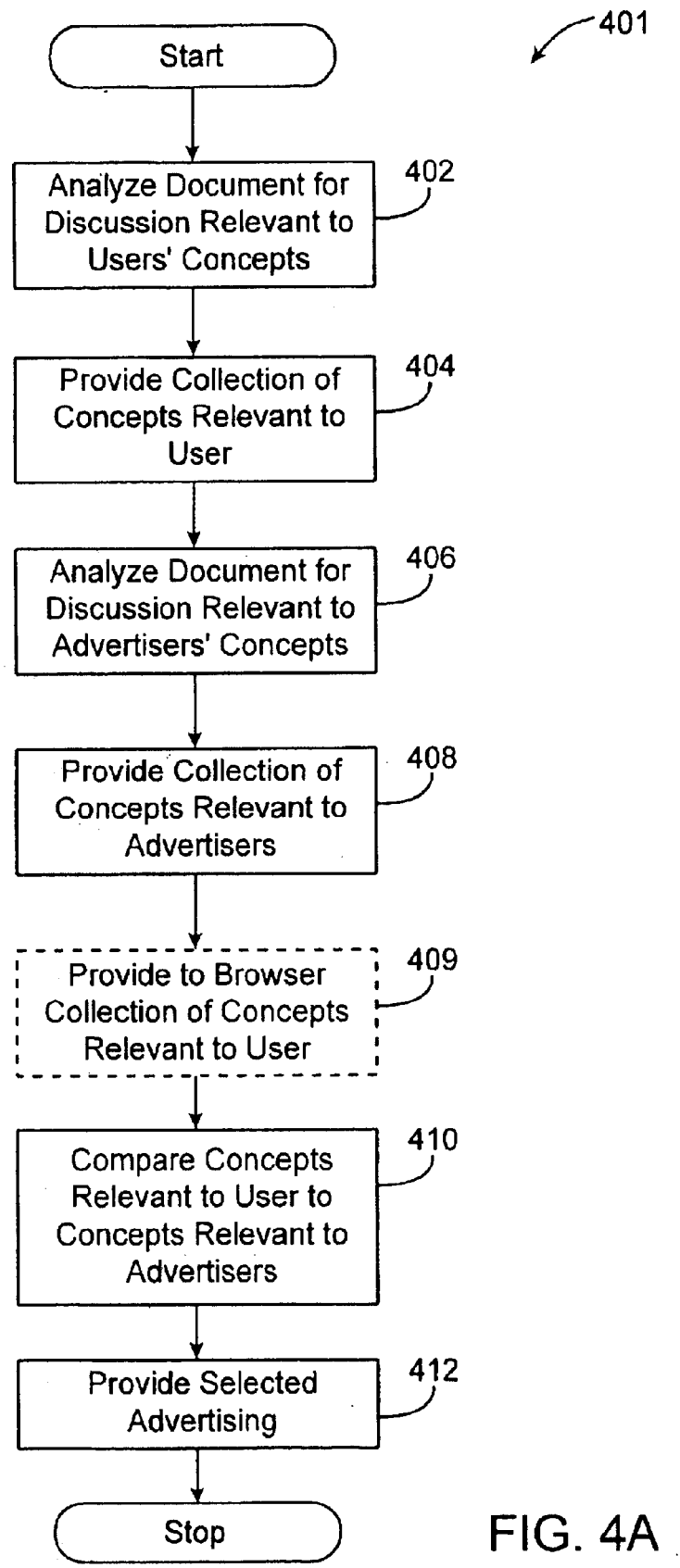
FIGS. 4A–4B illustrate simplified flowcharts of representative process steps in particular embodiments according to the present invention.

FIG. 4A depicts a flowchart 401 of simplified process steps for targeting marketing information to users based upon content of one or more documents displayed to the user in a particular representative embodiment according to the present invention. This diagram is merely an example which should not limit the scope of the claims herein. One of ordinary skill in the art would recognize many other variations, alternatives, and modifications. FIG. 4A illustrates a step 402 of analyzing a document to identify discussion corresponding to one or more user selectable concepts of interest. The content of documents can be analyzed using techniques described herein with reference to FIGS. 5–8 in which the text of a document is compared to a collection of concepts (i.e. concepts of interest), to generate a probability for each concept representing the similarity between concept and document. Further information about relevancy determination techniques can be had by reference to commonly owned U.S. patent application Ser. No. 08/995,616, the entire contents of which is incorporated herein by reference for all purposes. Then, in a step 404, a collection of relevant concepts can be produced based upon the probabilities determined in step 402.

Then, in a step 406, the contents of the document is again analyzed using the same technique as in step 402, to determine relevance between the document and concepts which represent advertiser definitions. In a specific embodiment, these advertising concepts can be keywords that advertisers have identified as being relevant to their product, for example. In a specific embodiment, a probability estimate can be generated for each advertising concept for each document. Then, in a step 408, a collection of relevant concepts can be produced based upon such probability estimates determined in step 406.

Next, in an optional step 409, the collection of concepts produced in step 404 can be delivered to a web browser configured to display indications of relevancy of the document to user. Then, in a step 410, a comparison can be made between the collection of user concepts provided by step 404 and collection of advertising concepts provided by step 408 in order to determine which advertising concepts are most similar, for example, to the user concepts. Then, in a step 412, the selected advertising can be delivered to the user. Optionally, the advertising can be displayed in a marketing information area of a web browser, for example.

Figure 4B:
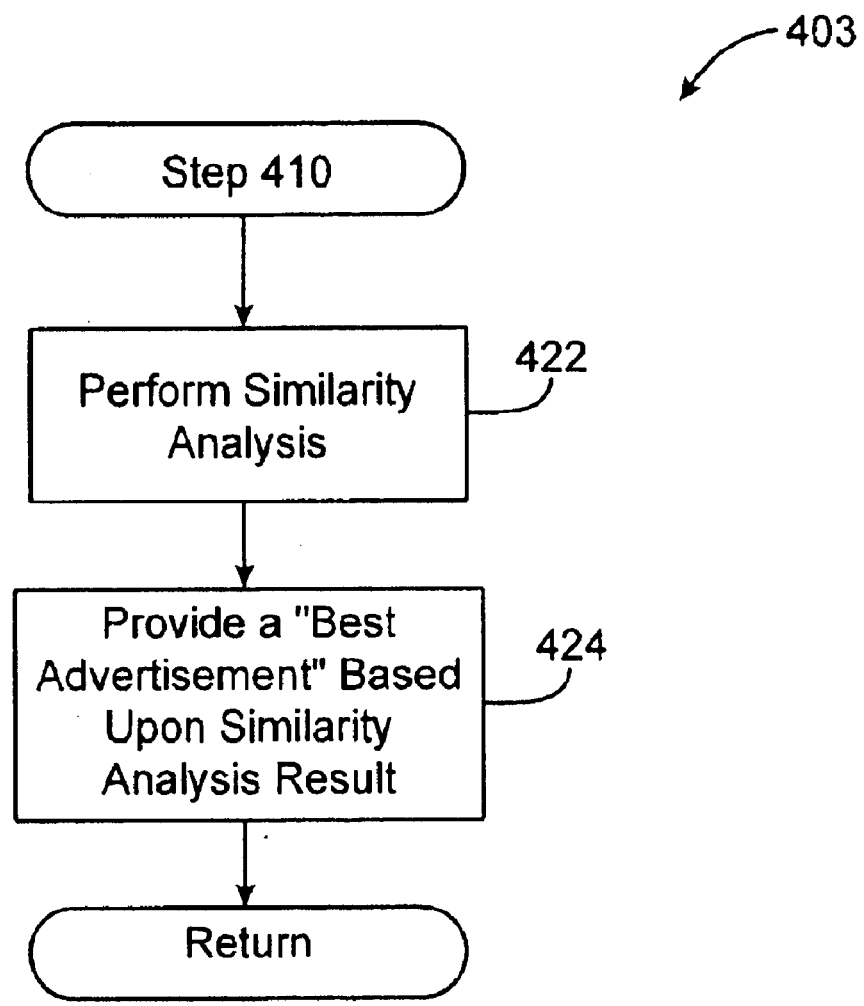

FIG. 4B depicts a flowchart 403 of simplified process steps for automatically associating advertising objects with web objects and user concepts of step 410 of FIG. 4A, in a particular representative embodiment according to the present invention. This diagram is merely an example which should not limit the scope of the claims herein. One of ordinary skill in the art would recognize many other variations, alternatives, and modifications. FIG. 4B illustrates a step 422 of performing similarity analysis between the user concepts provided in step 404 of FIG. 4A and the collection of relevant advertising concepts provided in step 408 of FIG. 4A.

In some specific embodiments, techniques well known to those of ordinary skill in the art could be used to perform a comparison such as that performed by step 422 of FIG. 4B. For instance, the book, "Information Storage and Retrieval," by Robert R. Korfbage, (John Wiley & Sons, Inc. 1997) describes several relevancy measures which can be used for matching. In one representative embodiment, a matching technique uses a document similarity method, in which each user and advertising concept could represent a document, i.e. a collection of terms. Some specific embodiments can use a term-frequency measure, in which vector representations for both the user and advertising concepts are created. These vectors can be compared to create a new vector the size of the target vector with 1's representing matches and 0's representing non-matches, for example. In a representative example, a user concept C can be represented as a vector of terms, $C=<t_1, t_2, t_3, \ldots, t_x>$, and an advertising concept A can be represented as a vector of terms, $A=<t_1, t_2, t_3, \ldots, t_y>$. A vector comparison that indicates the frequency of terms from vector $C_i$ in vector $A_j$ yields the vector: $V_{ij}=<0, 1, 1, 0, 1, 0, 0>$.

In this example, concept $C_i$ contains seven keywords of which three matched the advertising concept $A_j$. Let $W_{ij}$ represent the sum of the values in the vector $V_{ij}$. The similarity value for this comparison is represented by $S_{ij}$, which is equal to $W_{ij}$ divided by the length of $V_{ij}$ (which can be denoted by X,) multiplied by the comparison value, ci=0.56, generated in step 402 of FIG. 4A between the document and the user concept, e.g. (3/7)*0.56=0.24:

$$S_{ij} = \left(\frac{W_{ij}}{X_i}\right) \times c_i$$

The ci value provides a bias to the $S_{ij}$ value towards higher scoring user concepts. Given all relevant user concepts and all relevant advertising concepts, a matrix can be constructed having similarity values for each combination of user/advertising concepts. Table 1 illustrates a representative example of such a matrix in one specific embodiment.

TABLE 1

| Concept/Ad | Comparison matrix | | | | | Relevancy |
|---|---|---|---|---|---|---|
| | $C_1$ | $C_2$ | $C_3$ | ... | Ci | |
| $A_1$ | $S_{1,1}$ | $S_{2,1}$ | $S_{3,1}$ | ... | $S_{m,1}$ | $R_1$ |
| $A_2$ | $S_{1,2}$ | $S_{2,2}$ | $S_{3,2}$ | ... | $S_{m,2}$ | $R_2$ |
| $A_3$ | $S_{1,3}$ | $S_{2,3}$ | $S_{3,3}$ | ... | $S_{m,3}$ | $R_3$ |
| ... | ... | ... | ... | | ... | ... |
| Aj | $S_{1,n}$ | $S_{2,n}$ | $S_{3,n}$ | ... | $S_{m,n}$ | $R_n$ |

In this representative example, a collection of the relevant user concepts, $\{C_1, C_2, C_3, \ldots, Ci\}$, and relevant advertising concepts, $\{A_1, A_2, A_3, \ldots, Aj\}$ are included. The individual similarity value is represented for each comparison between user concept and advertising concept as $S_{ij}$, where i is the user concept index and j is the advertising concept index. Next, in a step 424, a "best" advertising concept given all of the user concepts can be determined. In this step, the comparison value generated in step 406 of FIG. 4A between advertising and document, aj, is used to bias the user/advertising concept comparison value $S_{ij}$ towards advertising concepts which are more similar to the current document. This combination for each advertising concept yields the final similarity measure used to rank the advertisements:

$$R_j = \left(\sum_i^m S_{ij}\right) \times a_j$$

If multiple advertisements with the same $R_j$ value are present, the aj value can be used to "break the tie," and the advertising concept with the higher score with respect to the document will be delivered to the user's browser. If $R_j$ does not exceed some threshold, e.g. 20% relevancy, the advertisements can be ranked using the original content based value aj. In this case, the better solution is to deliver an advertisement that is at least similar in content to the current document. Note that in the case where neither the $R_j$ value nor the aj value surpass a threshold, then either no advertisement is displayed, or other information in the advertisement area such as relevant headline news or news related to the user's profile can be displayed.

Figure 5:
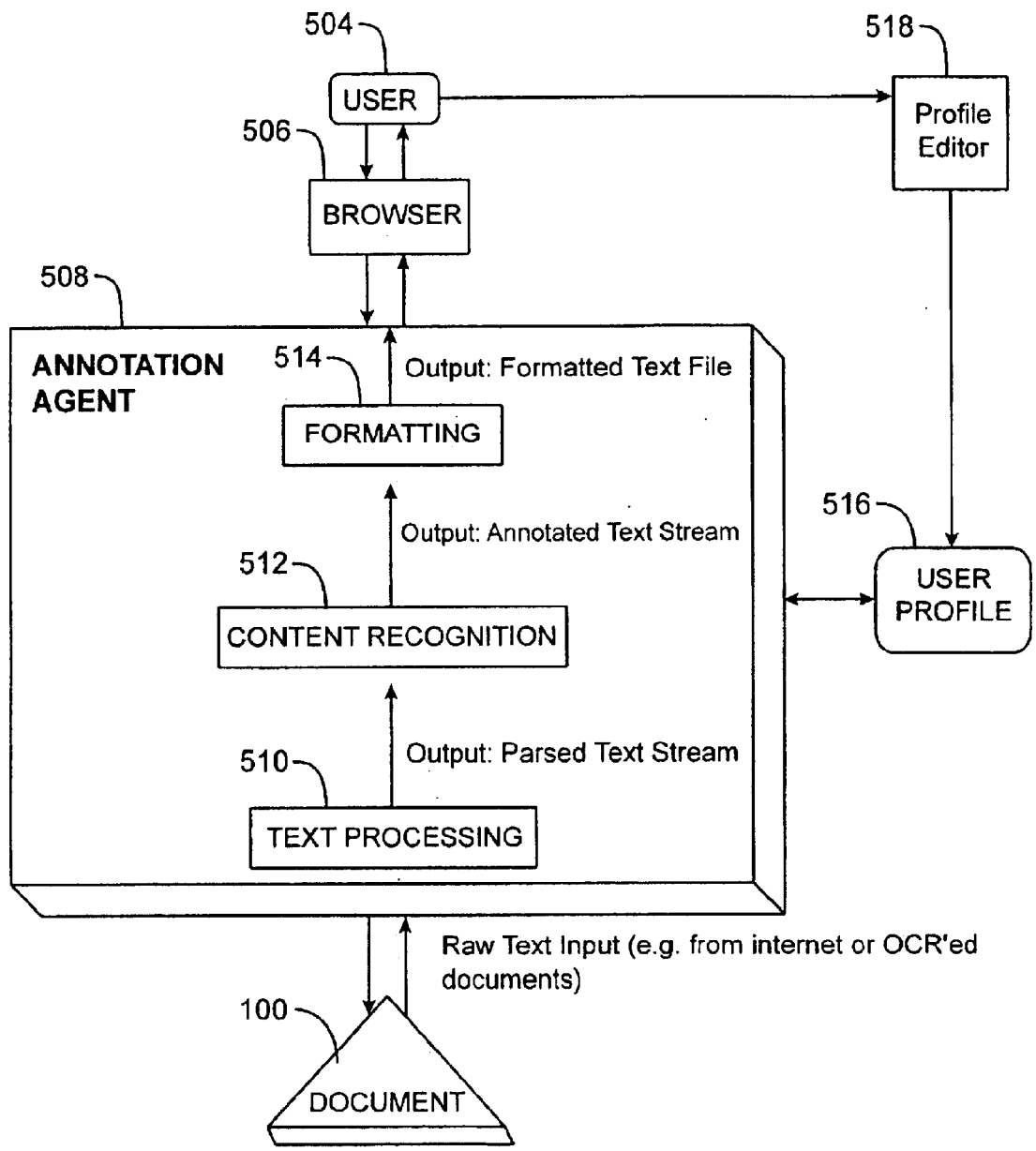
FIG. 5 illustrates a simplified flow block diagram for automatic annotation in a particular embodiment according to the present invention.

FIG. 5 depicts a simplified flow diagram for analyzing electronically stored documents for content in a particular embodiment according to the present invention. This diagram is merely an example which should not limit the scope of the claims herein. One of ordinary skill in the art would recognize many other variations, alternatives, and modifications. The method for analyzing electronically stored documents, such as web objects and the like, is more fully detailed in a commonly owned copending U.S. patent application Ser. No. 08/995,616, which is incorporated herein by reference in its entirety for all purposes. Document 100 is stored in an electronic format. It may have been scanned in originally. It may be, in HTML, Postscript, LaTeX, other word processing or e-mail formats, for example. The description that follows describes an embodiment that uses an HTML format. However, other formats may be used in other specific embodiments without departing from the scope of the present invention. A user 504 accesses document 100 through a browser 506. Browser 506 is preferably a hypertext browsing program such as NETSCAPE Navigator or MICROSOFT CORPORATION Internet Explorer but also may be, a conventional word processing program, for example.

Annotation agent 508 adds the annotations to document 100 to prepare it for viewing by browser 506. Processing by annotation agent 508 may be understood to be in three stages, a text processing stage 510, a content recognition stage 512, and a formatting stage 514. The input to text processing stage 510 can be raw text, or text having embedded html tags, for example. The output from text processing stage 510 and input to content recognition stage 512 is a parsed text stream, a text stream with formatting information such as special tags around particular words or phrases removed.

The output from content recognition stage 512 and input to formatting stage 514 is an annotated text stream. The output of formatting stage 514 is a formatted text file which may be printed or viewed with browser 506.

The processing of annotation agent 508 is preferably a run-time process. The annotations are not preferably pre-inserted into the text but are rather generated when user 504 requests document 100 for browsing. Thus, this is preferably a dynamic process. In an alternative embodiment, annotation agent 508 may instead operate in the background as a batch process.

The annotation added by annotation agent 508 depends on concepts of interest selected by user 504. User 504 also inputs information used by annotation agent 508 to identify locations of discussion of concepts of interest in document 100. In a preferred embodiment, this information defines the structure of a Bayesian belief network. The concepts of interest and other user-specific information are maintained in a user profile file 516. User 504 employs a profile editor 518 to modify the contents of user profile file 516.

Figure 6A:
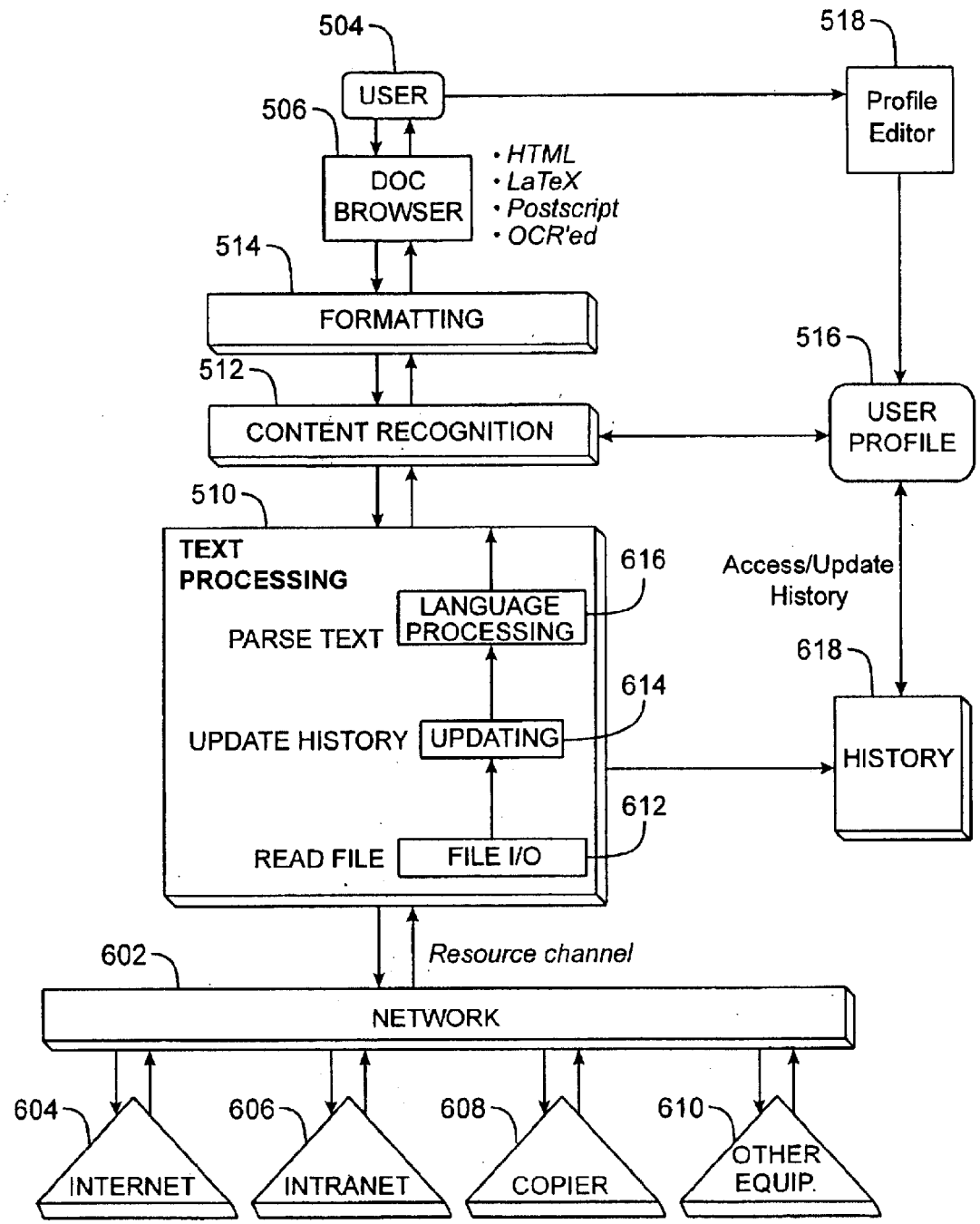
FIGS. 6A–6C illustrate simplified flow block diagrams for automatic annotation in a particular embodiment according to the present invention.

FIG. 6A depicts the automatic annotation software architecture of FIG. 5 with text processing stage 510 shown in greater detail. This diagram is merely an example which should not limit the scope of the claims herein. One of ordinary skill in the art would recognize many other variations, alternatives, and modifications. FIG. 6A shows that the source of document 100 may be accessed via a network 602. Possible sources include e.g., the Internet 604, an intranet 606, a digital copier 608 that captures document images, or other office equipment 610 such as a fax machine, scanner, printer, etc. Another alternative source is the user's own hard drive 332.

Text processing stage 510 includes a file I/O stage 612, an updating stage 614, and a language processing stage 616. File I/O stage reads the document file from network 602. Updating stage 614 maintains a history of recently visited documents in a history file 618. Language processing stage 616 parses the text of document 100 to generate the parsed text output of text processing stage 510.

Figure 6B:
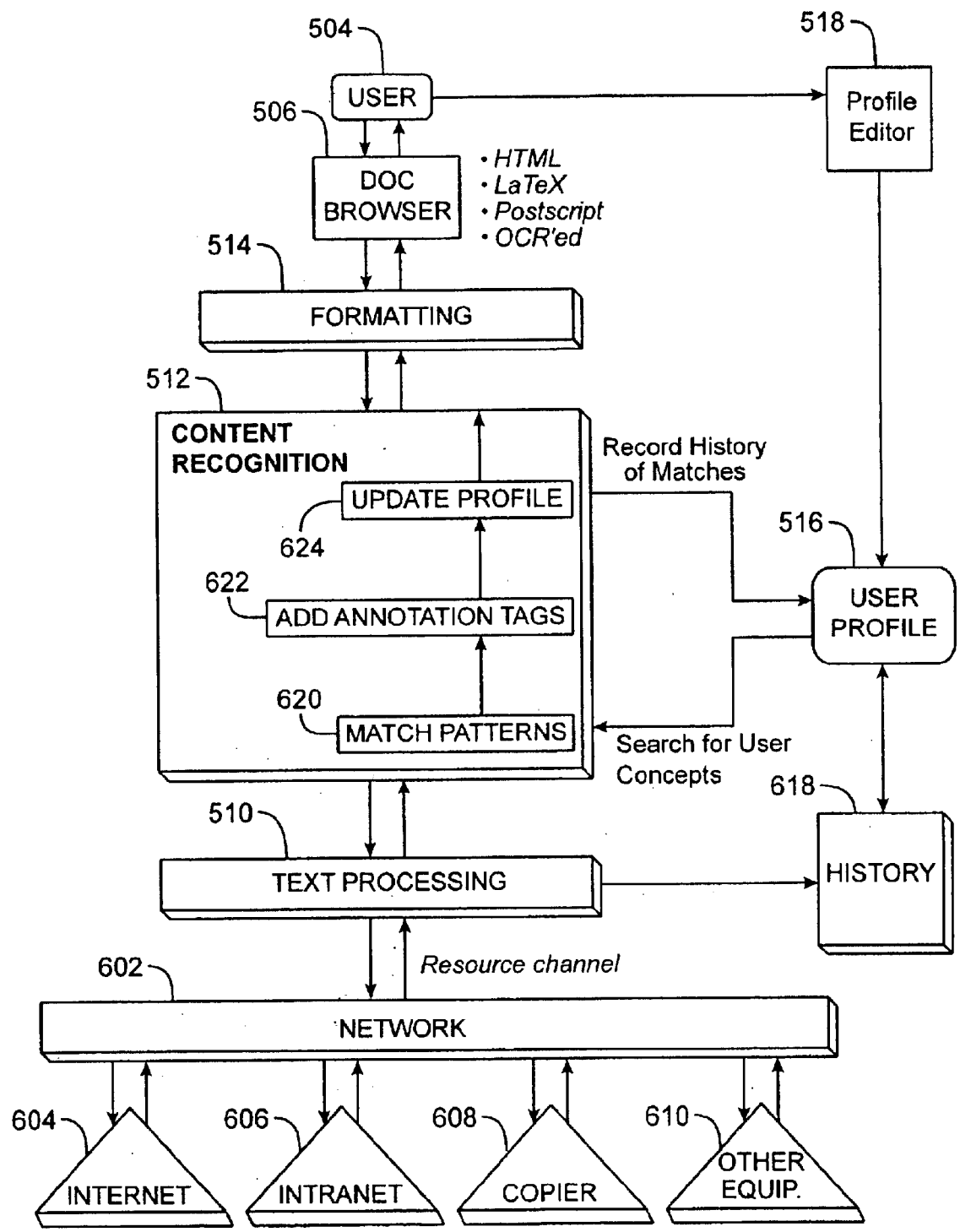

FIG. 6B depicts the automatic annotation flow diagram of FIG. 5 with content recognition stage 512 shown in greater detail. This diagram is merely an example which should not limit the scope of the claims herein. One of ordinary skill in the art would recognize many other variations, alternatives, and modifications. A pattern identification stage 620 looks for particular patterns in the parsed text output of text processing stage 510. The particular patterns searched for are determined by the contents of user profile file 516. Once the patterns are found, annotation tags are added to the parsed text by an annotation tag addition stage 622 to indicate the pattern locations. In a preferred HTML embodiment, these annotation tags are compatible with the HTML format. However, the tagging process may be adapted to LaTeX, Postscript, etc. A profile updating stage 624 monitors the output of annotation tag addition stage 622 and analyzes text surrounding the locations of concepts of interest. As will be further discussed with reference to FIG. 7, changes to the contents of user profile file 516 are based on the analysis of this surrounding text. The effect is to automatically refine the patterns searched for by pattern identification stage 620 to improve annotation performance.

Figure 6C:
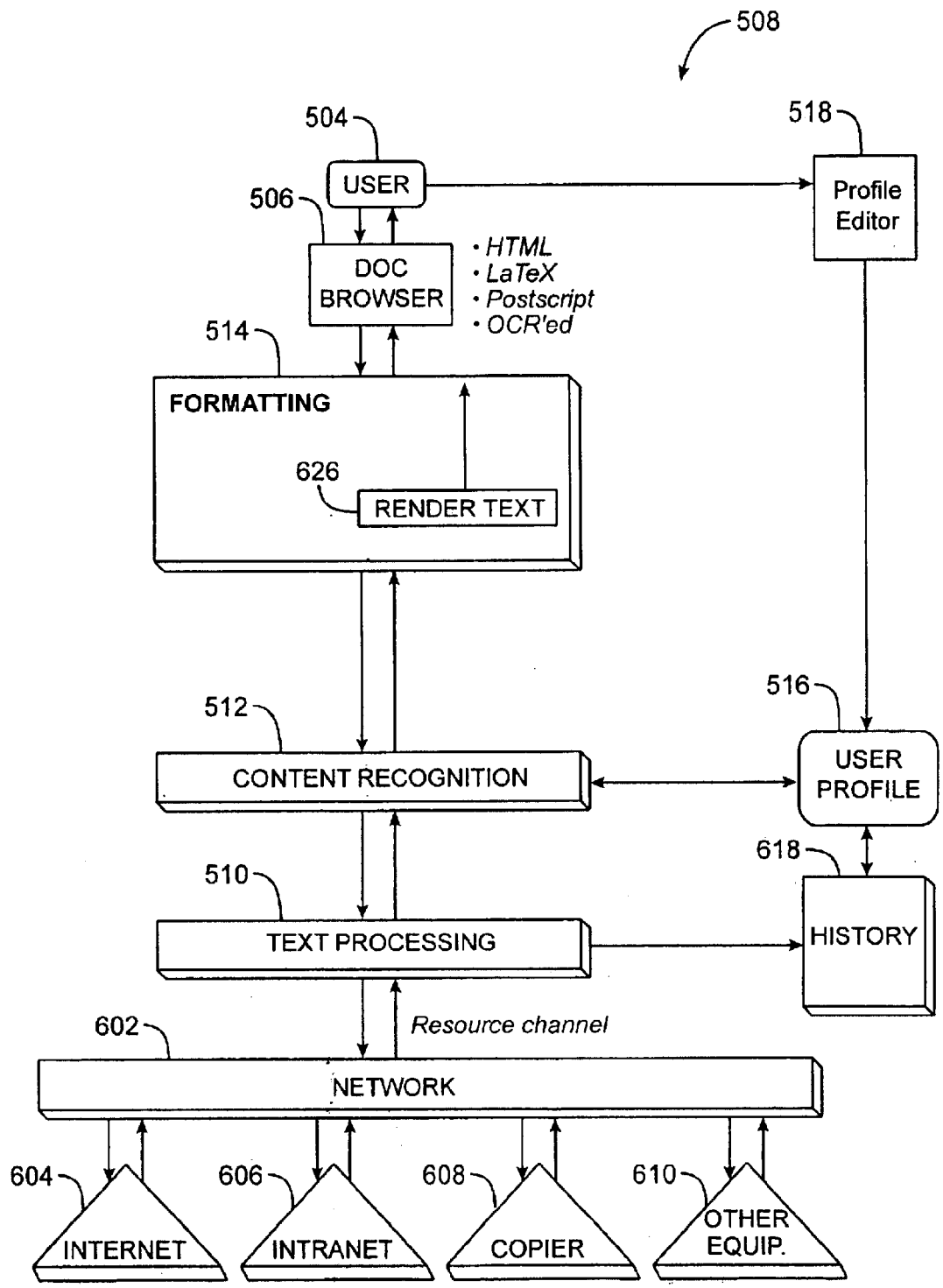

FIG. 6C depicts the automatic annotation flow diagram of FIG. 5 in a particular embodiment according to the present invention. This diagram is merely an example which should not limit the scope of the claims herein. One of ordinary skill in the art would recognize many other variations, alternatives, and modifications. Formatting stage 514 includes a text rendering stage 626 that formats the annotated text provided by content recognition stage 512 to facilitate viewing by browser 506. Pattern identification stage 620 looks for keywords and key phrases of interest and locates relevant discussion of concepts based on the located keywords. The identification of keywords and the application of the keywords to locating relevant discussion is preferably accomplished by reference to a reasoning or inference system. The reasoning system is preferably a Bayesian belief network.

Figure 7:
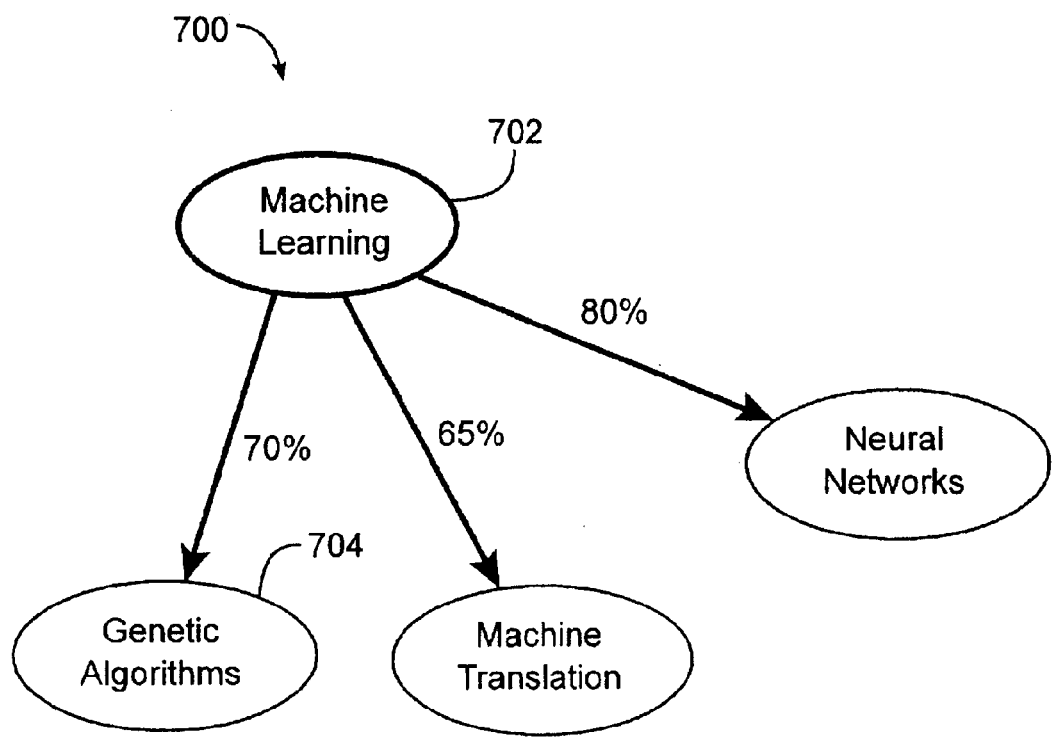
FIG. 7 illustrates a simplified diagram of a representative Bayesian belief network useful in automatic annotation in a particular embodiment according to the present invention.

FIG. 7 depicts a portion of a representative Bayesian belief network 700 implementing a reasoning system as used by pattern identification stage 620 in a particular embodiment according to the present invention. This diagram is merely an example which should not limit the scope of the claims herein. One of ordinary skill in the art would recognize many other variations, alternatives, and modifications. A first oval 702 represents a particular user-specified concept of interest. Other ovals 704 represent subconcepts related to the concept identified by oval 702. Each line between one of subconcept ovals 704 and concept oval 702 indicates that discussion of the subconcept implies discussion of the concept. Each connection between one of subconcept ovals 704 and concept oval 702 has an associated probability value indicated in percent. Discussion of the subconcept is in turn indicated by one or more keywords or key phrases (not shown in FIG. 7).

The structure of Bayesian belief network 700 is only one possible structure applicable to the present invention. For example, one could employ a Bayesian belief network with more than two levels of hierarchy so that the presence of subconcepts is suggested by the presence of "subsubconcepts," and so on. In the preferred embodiment, presence of a keyword or key phrase always indicates presence of discussion of the subconcept but it is also possible to configure the belief network so that presence of a keyword or key phrase suggests discussion of the subconcept with a specified probability.

The primary source for the structure of Bayesian belief network 700 including the selection of concepts, keywords and key phrases, interconnections, and probabilities is user profile file 516. In a preferred embodiment, user profile file 516 is selectable for both editing and use from among profiles for many users.

The structure of reasoning system 700 is modifiable during use of the annotation system. The modifications may occur automatically in the background or may involve explicit user feedback input. The locations of concepts of interest determined by pattern identification stage 620 are monitored by profile updating stage 624. Profile updating stage 624 notes the proximity of other keywords and key phrases within each analyzed document to the locations of concepts of interest. If particular keywords and key phrases are always near a concept of interest, the structure and contents of reasoning system 700 are updated in the background without user input by profile updating stage 624. This could mean changing probability values, introducing a new connection between a subconcept and concept, or introducing a new keyword. As used herein, keyword can comprise a single keyword, a phrase composed of one or more words, or a key phrase.

User 504 may select a word or phrase in document 100 as being relevant to a particular concept even though the word or phrase has not yet defined to be a keyword or phrase. Reasoning system 700 is then updated to include the new keyword.

User 504 may also give feedback for an existing keyword, indicating the perceived relevance of the keyword to the concept of interest. If the selected keyword is indicated to be of high relevance to the concept of interest, the probability values connecting the subconcept indicated by the selected keywords to the concept of interest increases. If, on the other hand, user 504 indicates the selected keywords to be of little interest, the probability values connecting these keywords to the concept decrease.

Figure 8:
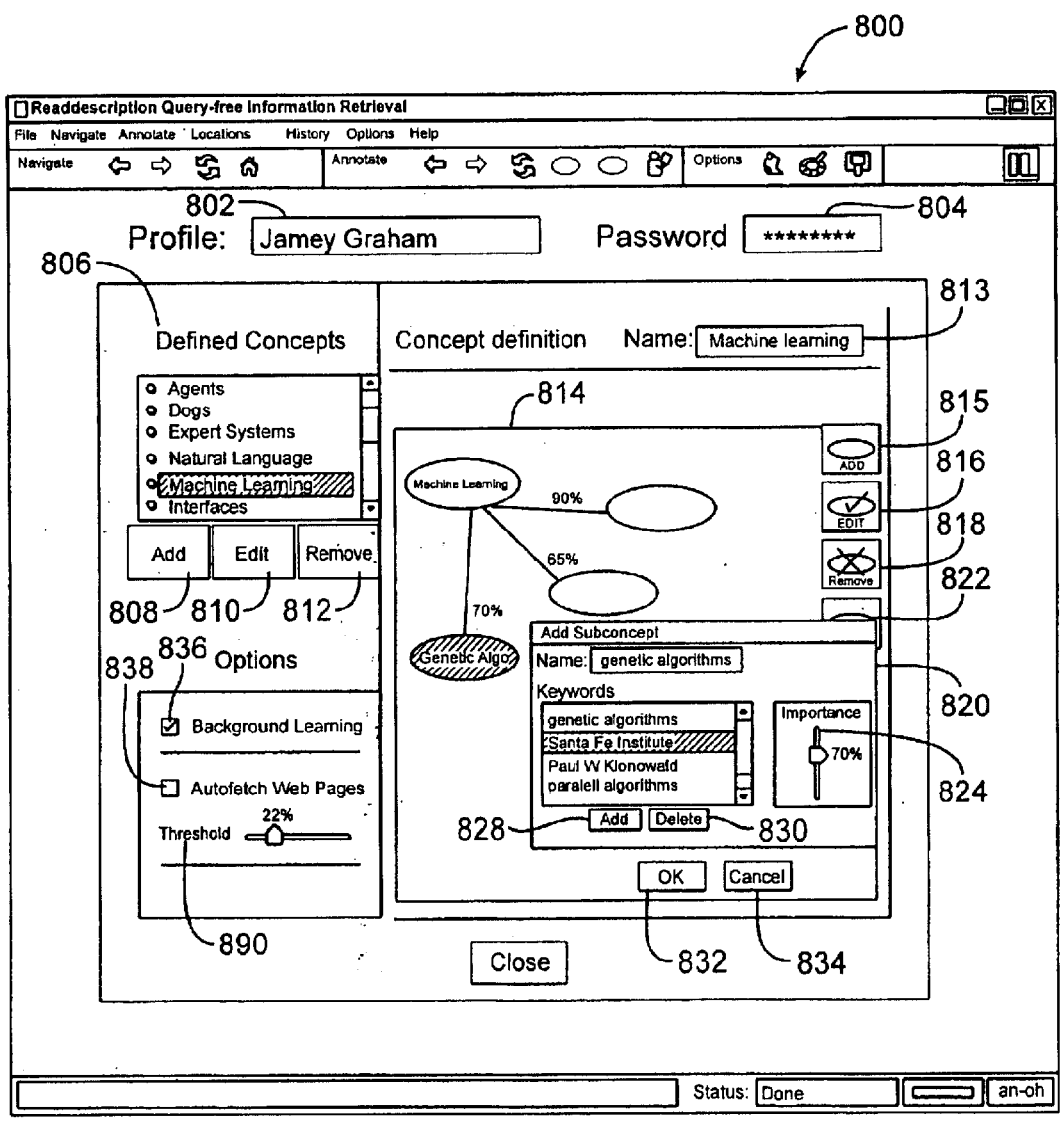
FIG. 8 illustrates a representative user interface for defining a user profile in a particular embodiment according to the present invention.

FIG. 8 depicts a user interface for defining a user profile in a particular embodiment according to the present invention. This diagram is merely an example which should not limit the scope of the claims herein. One of ordinary skill in the art would recognize many other variations, alternatives, and modifications. User interface screen 800 is provided by profile editor 518. A profile name box 802 permits the user to enter the name of the person or group to whom the profile to be edited is assigned. This permits the annotation system according to the present invention to be personalized to particular users or groups. A password box 804 provides security by requiring entry of a correct password prior to profile editing operations.

A defined concepts list 806 lists all of the concepts which already exist in the user profile. By selecting a concept add button 808, the user may add a new concept. By selecting a concept edit button 810, the user may modify the belief network as it pertains to the listed concept that is currently selected. By selecting a remove button 812, the user may delete a concept.

If a concept has been selected for editing, its name appears in a concept name box 813. The portion of the belief network pertaining to the selected concept is shown in a belief network display window 814. Belief network display window 814 shows the selected concept, the subconcepts which have been defined as relating to the selected concept and the percentage values associated with each relationship. The user may add a subconcept by selecting a subconcept add button 815. The user may edit a subconcept by selecting the subconcept in belief network display window 814 and then selecting a subconcept edit button 816. A subconcept remove button 818 permits the user to delete a subconcept from the belief network.

Selecting subconcept add button 815 causes a subconcept add window 820 to appear. Subconcept add window 820 includes a subconcept name box 822 for entering the name of a new subconcept. A slider control 824 permits the user to select the percentage value that defines the probability of the selected concept appearing given that the newly selected subconcept appears. A keyword list 826 lists the keywords and key phrases which indicate discussion of the subconcept. The user adds to the list by selecting a keyword add button 828 which causes display of a dialog box (not shown) for entering the new keyword or key phrase. The user deletes a keyword or key phrase by selecting it and then selecting a keyword delete button 830. Once the user has finished defining the new subconcept, he or she confirms the definition by selecting an OK button 832. Selection of a cancel button 834 dismisses subconcept add window 820 without affecting the belief network contents or structure. Selection of subconcept edit button 816 causes display of a window similar to subconcept add window 820 permitting redefinition of the selected subconcept.

By determining whether a background learning checkbox 836 has been selected, the user may enable or disable the operation of profile updating stage 624. A web autofetch check box 838 permits the user to select whether or not to enable an automatic web search process. When this web search process is enabled, whenever a particular keyword or key phrase is found frequently near where a defined concept is determined to be discussed, a web search tool such as ALTAVISTA is employed to look on the World Wide Web for documents containing the keyword or key phrase. A threshold slider control 840 is provided to enable the user to set a threshold relevance level for this autofetching process.

Figure 9A:
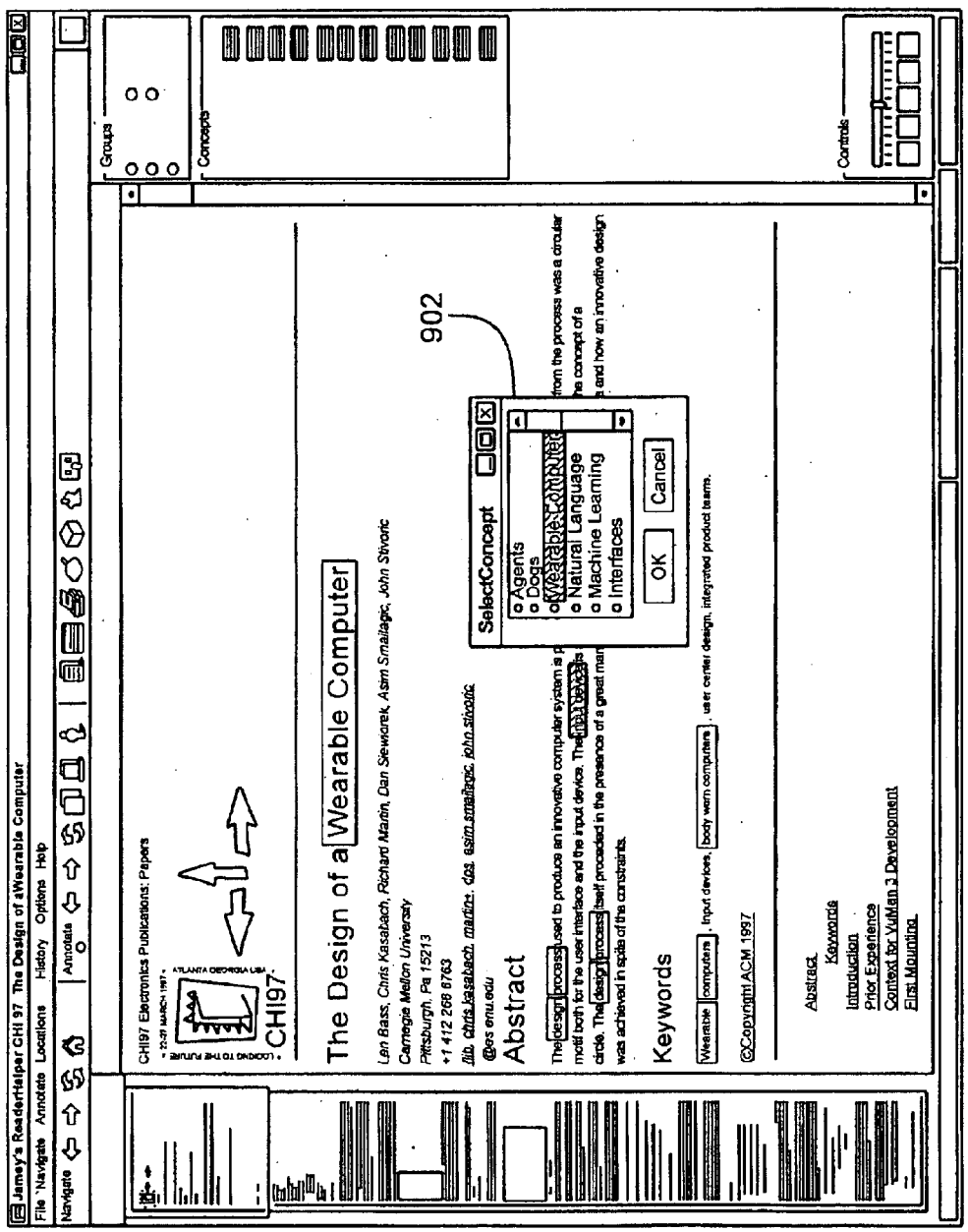
FIGS. 9A–9B illustrate a representative interface for providing user feedback in a particular embodiment according to the present invention.
Figure 9B:
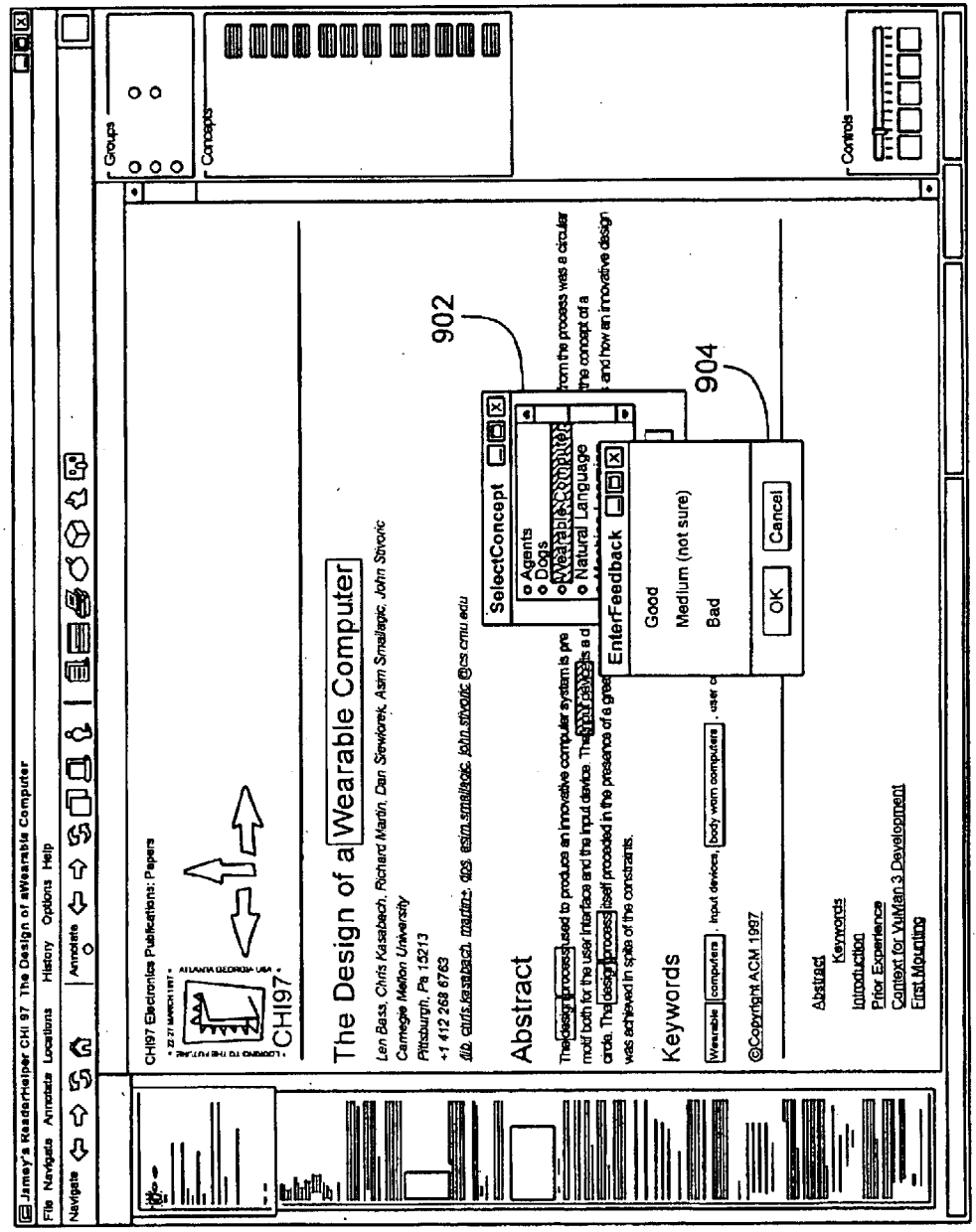

FIGS. 9A–9B depict a user interface for providing feedback in a particular embodiment according to the present invention. This diagram is merely an example which should not limit the scope of the claims herein. One of ordinary skill in the art would recognize many other variations, alternatives, and modifications. A user may select any text and call up a first feedback window 902. The text may or may not have been previously identified by the annotation system as relevant. In first feedback window 902 shown in FIG. 9A, user 504 may indicate the concept to which the selected text is relevant. First feedback window 902 may not be necessary when adjusting the relevance level for a keyword or key phrase that is already apart of belief network 700. After the user selects a concept in first feedback window 902, a second feedback window 904 is displayed for selecting the degree of relevance. Second feedback window 904 in FIG. 9B provides three choices for level of relevance: good, medium (not sure), and bad. Alternatively, a slider control could be used to set the level of relevance. If the selected text is not already a keyword or key phrase in belief network 700, a new subconcept is added along with the associated new keyword. If the selected text is already a keyword, probability values within belief network 700 can be modified appropriately in response to this user feedback.

FIG. 10 depicts a portion of an HTML document 100 processed in one embodiment according to the present invention. This diagram is merely an example which should not limit the scope of the claims herein. One of ordinary skill in the art would recognize many other variations, alternatives, and modifications. A block of text including relevant text is preceded by an a <SPAN . . . > tag, such as <SPAN . . . > tag 1006a in FIG. 10, and followed by an </SPAN> tag, such as </SPAN> tag 1008a, for example. The <SPAN . . . > tag includes the names of the concept and optionally, subconcept, to which the annotated text is relevant. For example, <SPAN . . .> tag 1006a includes the text, "class=rhtopic_Agent" indicating that the text in between the <SPAN . . . > tag 1006a and corresponding </SPAN> tag 1008a is relevant to the concept "Agent." The text "intelligent agent" comprises the text that is relevant to this particular concept in this representative example.

In a preferred embodiment, software to implement the present invention is written in the Java language. Preferably, the software forms a part of a stand-alone browser program. Alternatively, the code may be in the form of a so-called "plug-in" operating with a web browser used to browse HTML documents including the annotation tags explained above.

Figure 11A:
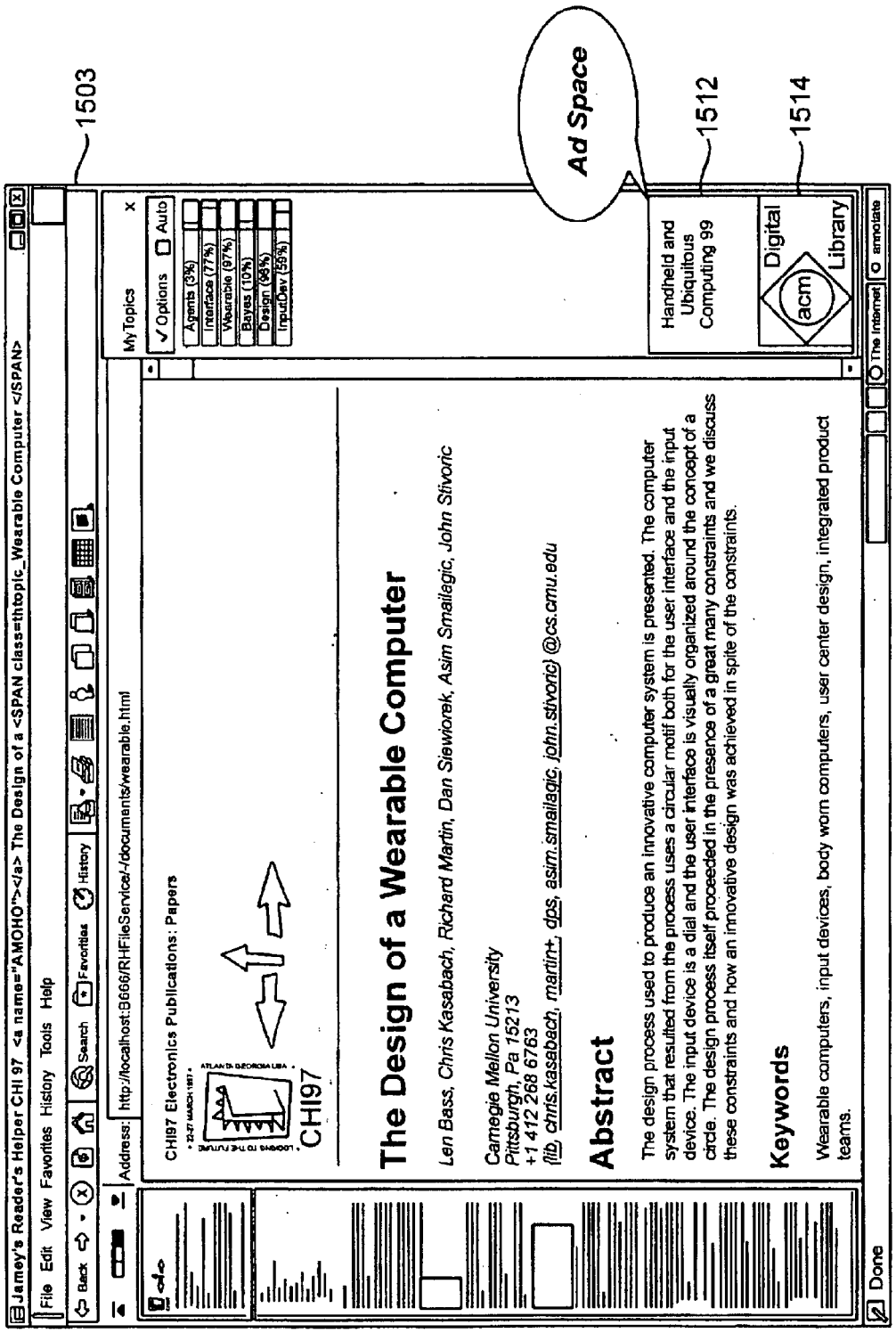
FIGS. 11A–11G illustrate representative screen displays in a particular, embodiment according to the present invention.

FIG. 11A is an illustration of a representative example of a marketing display area in a web browser according to a particular embodiment of the present invention. This diagram is merely an example which should not limit the scope of the claims herein. One of ordinary skill in the art would recognize many other variations, alternatives, and modifications. FIG. 11A depicts a browser screen 1503 having two advertisement display areas. A first advertisement 1512, for a conference on handheld, ubiquitous computing, and a second advertisement 1514, for the ACM Digital Library are displayed with browser screen 1503. In this particular example, both advertising display areas 1512 and 1514 display advertisements about a related concept, wearable computers. It is noteworthy that the advertisement displayed in area 1514 is directed to a broader aspect of the underlying concept of wearable computers than the advertisement displayed in area 1512. These advertisements have been selected using the relevancy determining techniques described herein. However, other embodiments having different concepts in display areas, or different arrangements of display areas, numbers of display areas and the like can be easily created by those of ordinary skill in the art without departing from the scope of the claims.

Figure 11B:
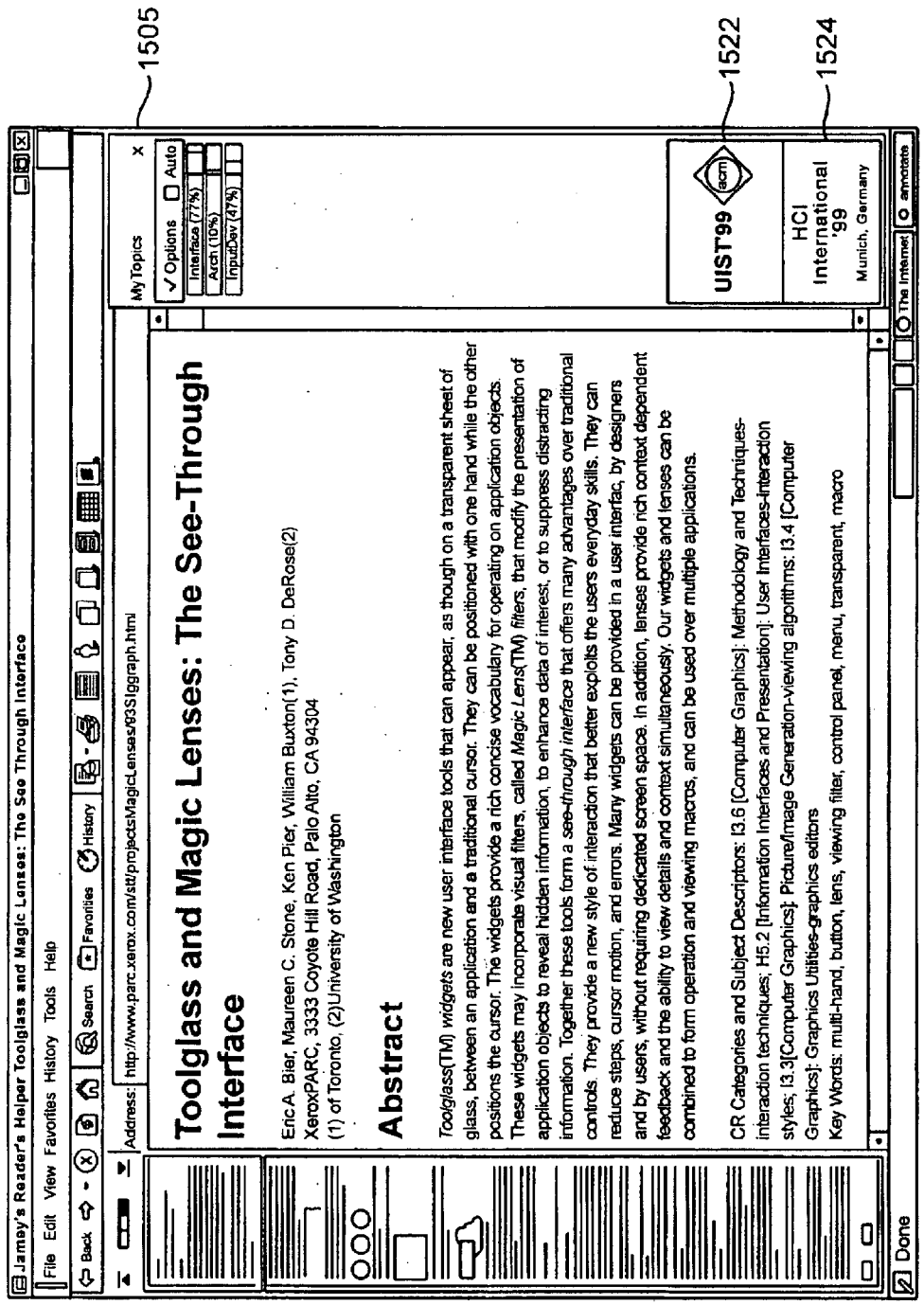

FIG. 11B is an illustration of a further representative example of a marketing information display area in a web browser according to a particular embodiment of the present invention. This diagram is merely an example which should not limit the scope of the claims herein. One of ordinary skill in the art would recognize many other variations, alternatives, and modifications. FIG. 11B depicts a display area 1505 having a technical document about a user interface tool displayed therein. The advertisements displayed in marketing display area 1522 and marketing display area 1524 point to two different conferences on user interfaces. These advertisements have been selected using the relevancy determining techniques described herein. Many other embodiments having different concepts in display areas, or different arrangements of display areas, numbers of display areas and the like can be easily created by those of ordinary skill in the art without departing from the scope of the claims.

Figure 11C:
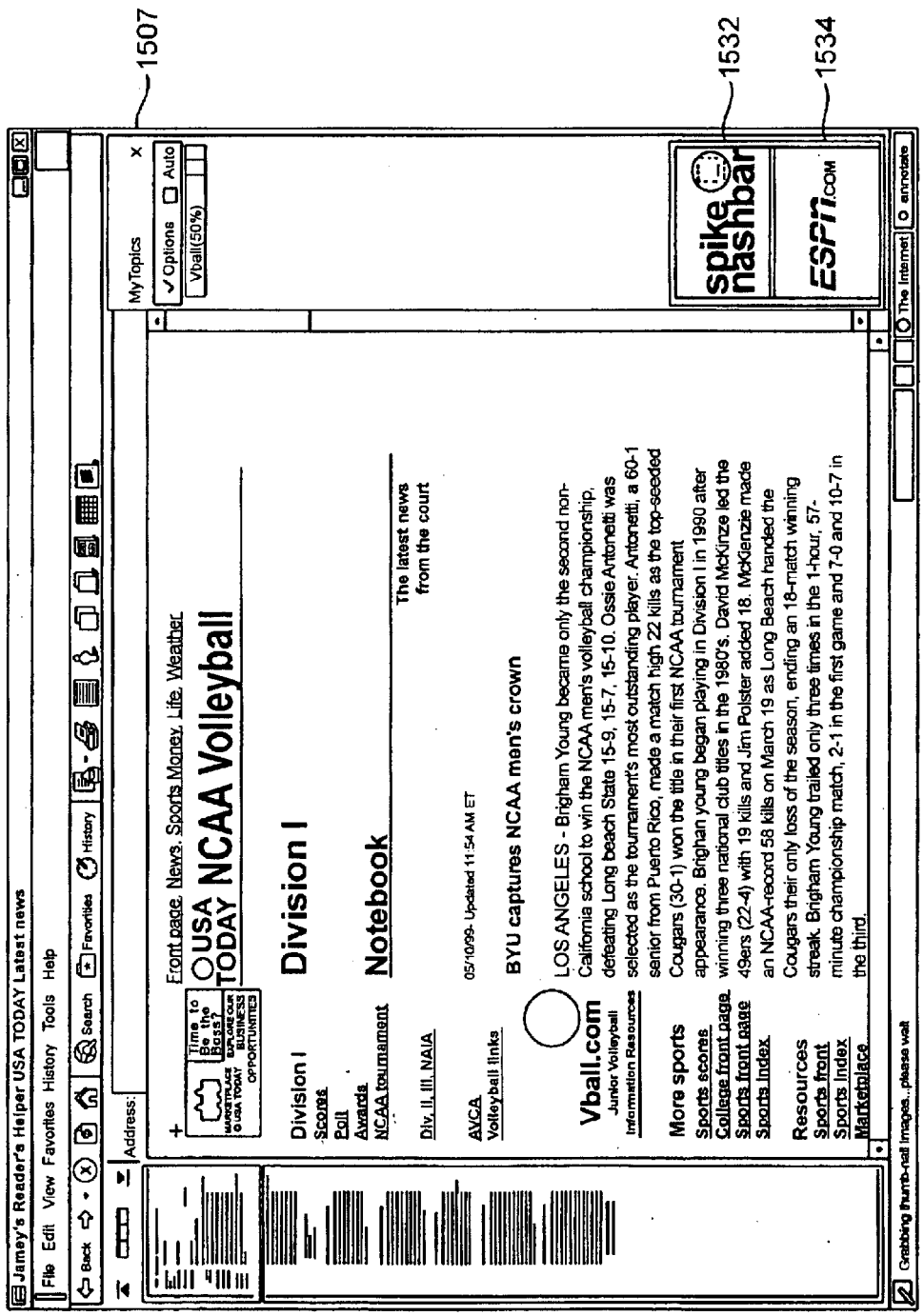

FIG. 11C is an illustration of a yet further representative example of a marketing information display area in a web browser according to a particular embodiment of the present invention. This diagram is merely an example which should not limit the scope of the claims herein. One of ordinary skill in the art would recognize many other variations, alternatives, and modifications. FIG. 11C depicts a browser screen 1507 having an article about NCAA volleyball. Advertisements that refer to a volleyball equipment supplier and ESPN are displayed in a first display area 1532 and a second display area 1534, respectively. These advertisements have been selected using the relevancy determining techniques described herein. Many other embodiments having different concepts in display areas, or different arrangements of display areas, numbers of display areas and the like can be easily created by those of ordinary skill in the art without departing from the scope of the claims.

Figure 11D:
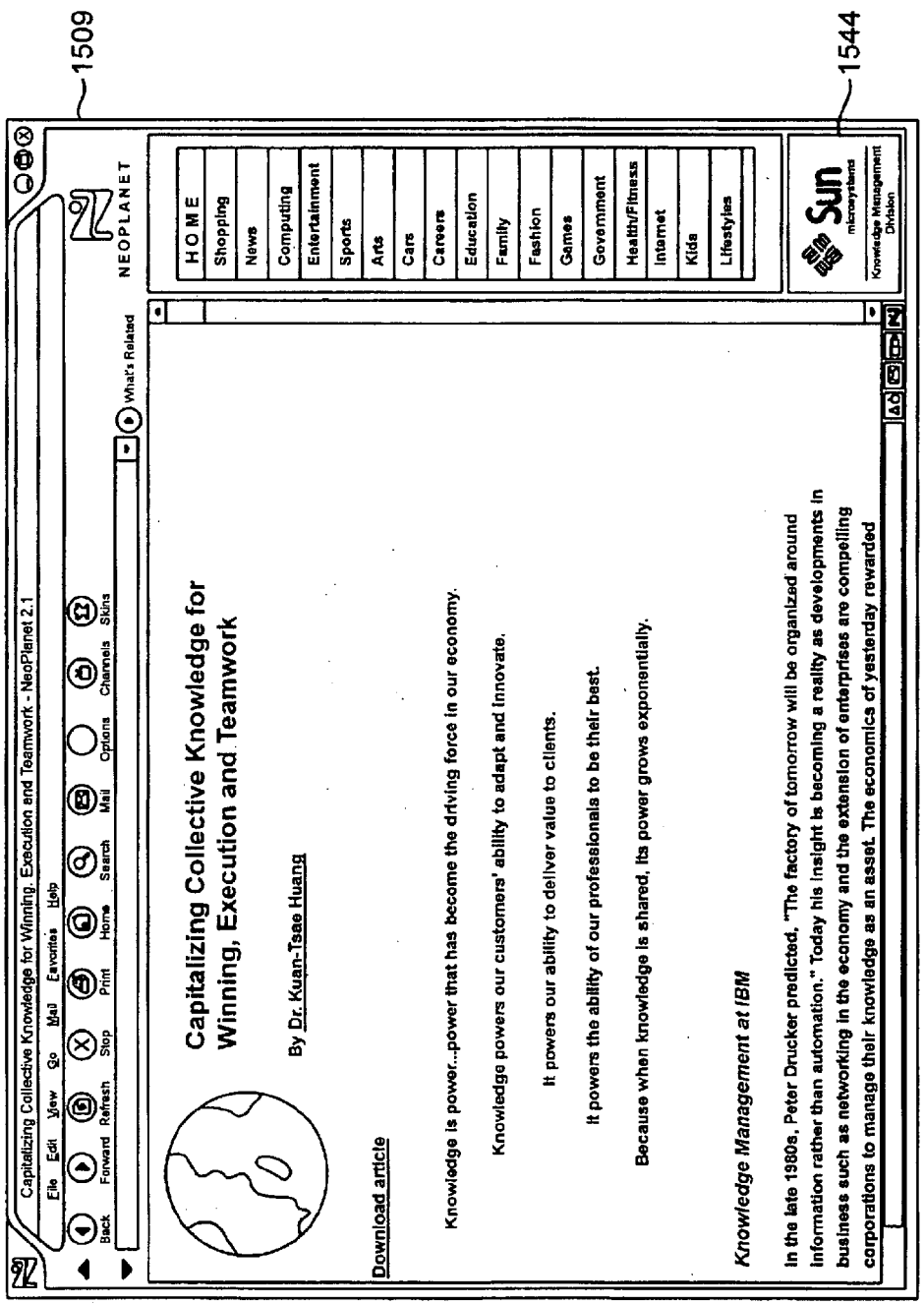

FIG. 11D is an illustration of a representative example of an marketing information display area in a web browser according to a particular embodiment of the present invention. This diagram is merely an example which should not limit the scope of the claims herein. One of ordinary skill in the art would recognize many other variations, alternatives, and modifications. FIG. 11D depicts a browser screen 1509, which can be a screen from a browser provided by NEOPLANET, for example. Many embodiments can be created using various browsers, such as Internet Explorer, by MICROSOFT CORPORATION, or NETSCAPE Navigator, by those of ordinary skill in the art. Browser screen 1509 illustrates a technical document in a display area. An advertisement for SUN MICROSYSTEMS is displayed in an advertising area 1544 of browser screen 1509. This advertisement has been selected using the relevancy determining techniques described herein. However, other embodiments having different concepts in display areas, or different arrangements of display areas, numbers of display areas and the like can be easily created by those of ordinary skill in the art without departing from the scope of the claims.

Figure 11E:
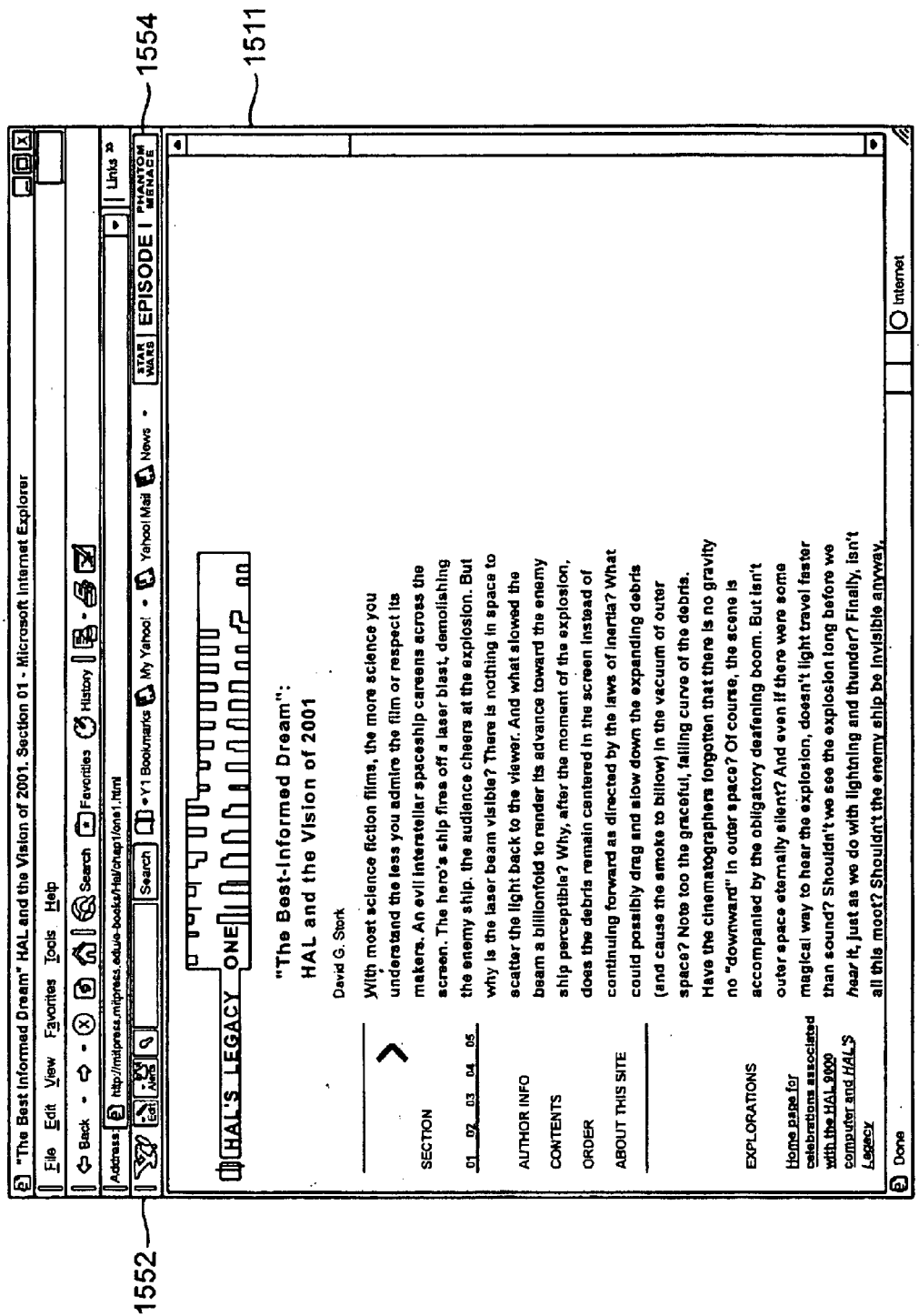

FIG. 11E is an illustration of a yet further representative example of a marketing information display area in a web browser according to a particular embodiment of the present invention. This diagram is merely an example which should not limit the scope of the claims herein. One of ordinary skill in the art would recognize many other variations, alternatives, and modifications. FIG. 11E depicts a browser screen 1511 having a toolbar 1552. The browser screen 1511 is an Internet Explorer 5.0 browser, by MICROSOFT CORPORATION and toolbar 1552 is a toolbar by YAHOO, Incorporated. Toolbar 1552 comprises a marketing display area 1554 for an advertisement. Display screen 1511 displays a document about a science fiction book and movie, "2001 Space Odyssey." Marketing display area 1554 depicts an advertisement for a "Star Wars" movie. This advertisement has been selected using the relevancy determining techniques described herein. Many other embodiments having different concepts in display areas, or different arrangements of display areas, numbers of display areas and the like can be easily created by those of ordinary skill in the art without departing from the scope of the claims.

Figure 11F:
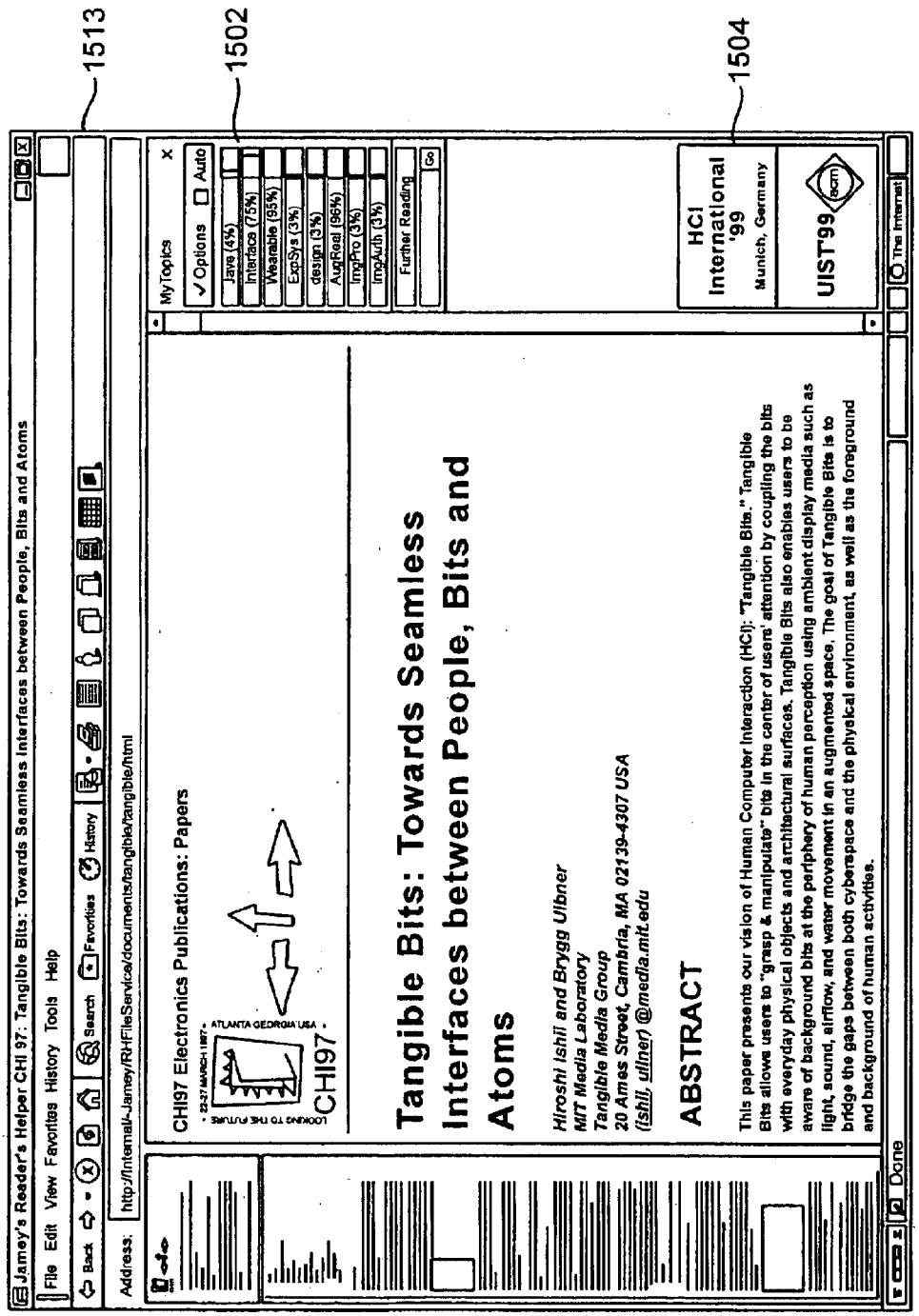
Figure 11G:
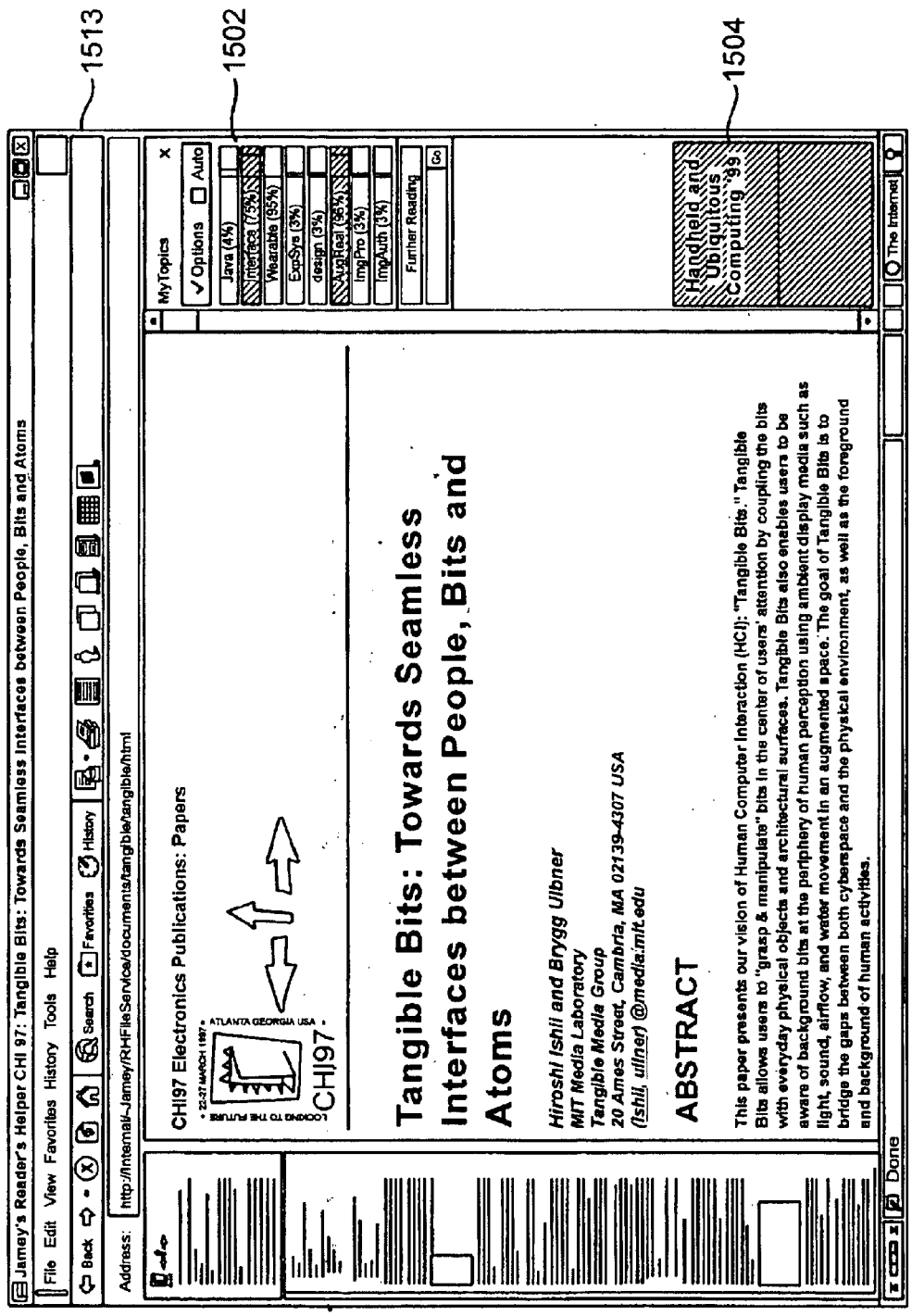

FIGS. 11F and 11G illustrate the operation of concept selection and advertisement targeting in particular embodiments of the present invention. These diagrams are merely examples which should not limit the scope of the claims herein. One of ordinary skill in the art would recognize many other variations, alternatives, and modifications. FIG. 11F depicts a browser screen 1513 having a plurality of concepts 1502, each of which has been selected by a user to indicate that the user is interested in these concepts. Browser screen 1513 includes an advertising display area 1504, that is displaying two advertisements relevant to the selected concepts. A first advertisement is for an HCI International Conference. A second advertisement is for a UIST '99 Conference. By contrast, FIG. 11G depicts browser screen 1513 as well. However, in FIG. 11G, the user has disabled two concepts, Interface and AugReal (Augmented Reality) from among the plurality of concepts 1502. Responsive to this change in selected concepts of interest, advertising display area 1504 now displays two different advertisements. A first advertisement is for an Ubiquitous and Handheld Computing Conference. A second advertisement is about IBM. Because the user has altered the selection of concepts of interest, the two advertisements displayed are now the most relevant to the user. These advertisements have been selected using the relevancy determining techniques described herein. Many other embodiments having different concepts in display areas, or different arrangements of display areas, numbers of display areas and the like can be easily created by those of ordinary skill in the art without departing from the scope of the claims.

In conclusion, the present invention provides for a method of document content analysis for targeting advertising. In the foregoing specification, the invention has been described with reference to a specific exemplary embodiments thereof.

Many changes or modifications are readily envisioned. For example, changing the size or arrangement of the document images in the display, changing the appearance and features of document images; adding audio effects when manipulating the document images, etc.; adding audio memos describing the contents of the document images, substituting any reasoning system for a Bayesian belief network, among other changes, are included within other embodiments of the present invention. It will be evident, however, that various modifications and changes may be made thereunto without departing from the broader spirit and scope of the invention as set forth in the appended claims and their full scope of equivalents.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method for targeting advertising to a user based upon content of a document displayed to said user, said method comprising:

comparing said content of said document to user selectable concepts of interest to identify the user selectable concepts of interest that are relevant to said document;

comparing said content of said dicynetb ti advertiser selectable concepts of interest to identify the advertiser selectable concepts of interest that are relevant to said document;

comparing said relevant user selectable concepts of interest to said relevant advertiser selectable concepts of interest to determine an overall relevance; and selecting an advertising based upon said overall relevance.

2. The method of claim 1 further comprising displaying said selected advertising in a marketing information area of a web browser.

3. The method of claim 1 wherein said comparing said relevant user selectable concepts of interest further comprises:

measuring a similarity between a first set of terms and a second set of terms;

wherein said first set of terms comprises said user concepts and said second set of terms comprises said advertiser concepts.

4. The method of claim 1 wherein said comparing said relevant user seletable concepts of interest further comprises;

measuring a term frequency between a first vector C and a second vector A;

wherein said first vector comprises said user concepts, $c_i$, and said second vector comprises said advertiser concepts, $a_j$; said first vector having m user concepts and said second vector having n advertiser concepts; and comparing said first vector and said second vector to obtain a third vector $V_{ij}$;

wherein said third vector comprises an indication of a match of concepts common to said first vector and said second vector.

5. The method of claim 4 further comprising:

determining a number of indications of matches, $W_{ij}$ in said third vector, $V_{ij}$;

determine a length, $X_i$, of said third vector, $V_{ij}$;

determining a value, $c_i$; and determining a similarity value, $S_{ij}$, according to the relationship:

$$S'_{ij} = \left(\frac{W_{ij}}{X_i}\right) \times c_i.$$

6. The method of claim 5 further comprising:

determining said relevancy, $R_j$, according to the relationship:

$$R_j = \left(\sum_i^m S_{ij}\right) \times a_j.$$

7. A system for providing targeted advertising to a user based upon a content of a document displayed to said user, said system comprising:

a profile content recognizer that compares said content of said document to at least one of a plurality of user selectable concepts to identify the user selectable concepts that are relevant to said content of said document;

an advertising content recognizer that compares said content of said document to said at least one of a plurality of advertiser selectable concepts to identify the advertiser selectable concepts that are relevant to said document; and a comparator that compares said relevant user selectable concepts with said relevant advertiser selectable concepts to identify one or more most relevant advertiser concepts, and selects from a plurality of stored advertisements ones that are relevant to the information contained in said document based upon said one or more most relevant advertiser concepts.

8. The system of claim 7 wherein said advertising content recognizer selects a best advertisement from said stored advertisements.

9. A computer program product for targeting advertising to a user based upon a content of a document displayed to said user, said computer program product comprising:

code for comparing said content of said document to at least one of a plurality of user selectable concepts of interest to identify the user selectable concepts of interest that are relevant to said content of said document;

code for comparing said content of said document to at least one of a plurality of advertiser selectable concepts of interest to identify the advertiser selectable concepts of interest that are relevant to said content of said document;

code for comparing said relevant user selectable concepts of interest to said relevant advertiser selectable concepts of interest to determine an overall relevance;

code for selecting an advertising based upon said overall relevance; and a computer readable storage medium for holding the codes.

10. A method for automatically associating advertising objects with web objects, said method comprising:

comparing a web object to first concepts of interest to identify one or more of the first concepts of interest that are relevant to said web object;

comparing said web object to second concepts of interest to identify one or more of the second concepts of interest that are relevant to said web object;

determining an overall relevance between said relevant first concepts of interest and said relevant second concepts of interest; and associating said web object with an advertising object based upon said overall relevance.

11. The method of claim 10 wherein said determining further comprises:

measuring a similarity between a first set of terms and a second set of terms;

wherein said first set of terms comprises said first concepts of interest and said second set of terms comprises said second concepts of interest.

12. The method of claim 10 wherein said determining an overall relevance between said relevant first concepts of interest and said relevant second concepts of interest further comprises:

measuring a term frequency between a first vector C and a second vector A;

wherein said first vector comprises said first concepts of interest, $c_i$, and said second vector comprises said second concepts of interest, $a_j$; said first vector having m concepts and said second vector having n concepts; and comparing said first vector and said second vector to obtain a third vector $V_{ij}$, wherein said third vector comprises an indication of a match of concepts common to said first vector and said second vector.

13. The method of claim 12 further comprising:

determining a number of indications of matches, $W_{ij}$ in said third vector, $V_{ij}$;

determining a length, $X_i$, of said third vector, $V_{ij}$;

determining a value, $c_i$; and determining a similarity value, $S_{ij}$, according to the relationship:

$$S'_{ij} = \left(\frac{W_{ij}}{X_i}\right) \times c_i.$$

14. The method of claim 13 further comprising:

determining said overall relevance, $R_j$, according to the relationship;

$$R_j = \left(\sum_i^m S_{ij}\right) \times a_j.$$

15. The method of claim 14 further comprising displaying said advertising in a marketing information area of a web browser.

16. A computer program product for automatically associating advertising objects with web objects, said product comprising:

code for analyzing a web object to identify information corresponding to first concepts of interest that are relevant to said web object;

code for analyzing said web object to identify information corresponding to second concepts of interest that are relevant to said web object;

code for determining a relevance between said first concepts of interest and said second concepts of interest;

code for associating said web object with said at least one advertising object based upon said relevance; and a computer readable storage medium for holding the codes.

* * * * *

UNITED STATES PATENT AND TRADEMARK OFFICE
CERTIFICATE OF CORRECTION

PATENT NO. : 6,804,659 B1 Page 1 of 1
DATED : October 12, 2004
INVENTOR(S) : Jamey Graham et al.

It is certified that error appears in the above-identified patent and that said Letters Patent is hereby corrected as shown below:

Column 17,
Line 27, "dicynetb ti" should read -- document to --.

Signed and Sealed this

Fifteenth Day of November, 2005

JON W. DUDAS
*Director of the United States Patent and Trademark Office*